United States Patent
Matsumoto et al.

(10) Patent No.: US 8,135,797 B2
(45) Date of Patent: Mar. 13, 2012

(54) MANAGEMENT POLICY EVALUATION SYSTEM AND RECORDING MEDIUM STORING MANAGEMENT POLICY EVALUATION PROGRAM

(75) Inventors: Yasuhide Matsumoto, Kawasaki (JP); Masatomo Yasaki, Kawasaki (JP); Masashi Uyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 793 days.

(21) Appl. No.: 11/236,630

(22) Filed: Sep. 28, 2005

(65) Prior Publication Data

US 2007/0002762 A1    Jan. 4, 2007

(30) Foreign Application Priority Data

Jun. 29, 2005    (JP) ................................. 2005-190616

(51) Int. Cl.
  G06F 15/16    (2006.01)
  G06F 17/00    (2006.01)

(52) U.S. Cl. ............ 709/217; 709/223; 705/14; 705/26; 705/27; 705/37; 705/400; 705/10; 705/4; 705/7; 705/8; 370/252

(58) Field of Classification Search .................. 709/223, 709/217; 370/252; 705/10, 400, 4, 7, 8, 705/14, 27, 37
  See application file for complete search history.

(56) References Cited

U.S. PATENT DOCUMENTS

| | | | | |
|---|---|---|---|---|
| 6,038,571 A | * | 3/2000 | Numajiri et al. ....................... 1/1 |
| 6,047,051 A | * | 4/2000 | Ginzboorg et al. ........... 379/130 |
| 6,094,680 A | * | 7/2000 | Hokanson ..................... 709/223 |
| 7,069,295 B2 | * | 6/2006 | Sutherland et al. ........... 709/203 |
| 7,092,776 B2 | * | 8/2006 | Torii et al. ........................ 700/99 |
| 7,181,743 B2 | * | 2/2007 | Werme et al. ................. 718/104 |
| 7,249,179 B1 | * | 7/2007 | Romero et al. ............... 709/226 |
| 7,251,611 B2 | * | 7/2007 | Abbott et al. ...................... 705/7 |
| 7,305,278 B2 | * | 12/2007 | Enright et al. ................ 700/115 |
| 7,349,965 B1 | * | 3/2008 | Graupner et al. ............. 709/226 |
| 7,424,713 B2 | * | 9/2008 | Fujino ........................... 718/104 |
| 7,711,655 B2 | * | 5/2010 | Abe et al. ...................... 705/400 |
| 2001/0032029 A1 | * | 10/2001 | Kauffman ....................... 700/99 |

(Continued)

FOREIGN PATENT DOCUMENTS

JP    10-228463 A    8/1998

(Continued)

OTHER PUBLICATIONS

Fujitsu Limited, "Service Structure Analysis Technology" for On-demand Service, Fujitsu Journal, vol. 30, No. 7, 2004, Aug. 2004, pp. 30-31 with a partial English Language Translation.

(Continued)

*Primary Examiner* — John Follansbee
*Assistant Examiner* — Saket K Daftuar
(74) *Attorney, Agent, or Firm* — Westerman, Hattori, Daniels & Adrian, LLP

(57) ABSTRACT

A management policy evaluation system for evaluating a management policy includes: a demand recording part for recording demand data representing a change in a value of a demand in a predetermined period; a supply recording part for recording supply data representing a change in a value of a supply in the predetermined period; a calculation part for comparing the demand data with the supply data, so as to calculate shortage/surplus data representing a change in shortage/surplus of an IT resource with respect to the demand in the predetermined period; and an evaluation part for generating evaluation data representing a loss or a profit to be created when the IT resource is assigned based on the management policy.

15 Claims, 14 Drawing Sheets

U.S. PATENT DOCUMENTS

| | | | |
|---|---|---|---|
| 2002/0049841 A1* | 4/2002 | Johnson et al. | 709/225 |
| 2002/0114341 A1* | 8/2002 | Sutherland et al. | 370/428 |
| 2003/0014524 A1* | 1/2003 | Tormasov | 709/226 |
| 2003/0028642 A1* | 2/2003 | Agarwal et al. | 709/226 |
| 2003/0069823 A1* | 4/2003 | Hoffman et al. | 705/37 |
| 2003/0110104 A1* | 6/2003 | King et al. | 705/28 |
| 2003/0125996 A1* | 7/2003 | Bush et al. | 705/7 |
| 2003/0220830 A1* | 11/2003 | Myr | 705/10 |
| 2004/0111308 A1* | 6/2004 | Yakov | 705/8 |
| 2004/0111358 A1* | 6/2004 | Lange et al. | 705/37 |
| 2004/0111725 A1* | 6/2004 | Srinivasan et al. | 718/105 |
| 2004/0194061 A1* | 9/2004 | Fujino | 717/120 |
| 2004/0204775 A1* | 10/2004 | Keyes et al. | 700/29 |
| 2004/0210889 A1* | 10/2004 | Childress et al. | 717/168 |
| 2004/0236591 A1* | 11/2004 | Johnson et al. | 705/1 |
| 2004/0249743 A1* | 12/2004 | Virginas et al. | 705/37 |
| 2004/0254899 A1* | 12/2004 | Abe et al. | 705/412 |
| 2005/0015283 A1* | 1/2005 | Iino et al. | 705/4 |
| 2005/0033846 A1* | 2/2005 | Sankaranarayan et al. | 709/226 |
| 2005/0038723 A1* | 2/2005 | Nishimaki | 705/35 |
| 2005/0044205 A1* | 2/2005 | Sankaranarayan et al. | 709/223 |
| 2005/0055322 A1* | 3/2005 | Masters et al. | 707/1 |
| 2005/0102674 A1* | 5/2005 | Tameshige et al. | 718/100 |
| 2005/0131982 A1* | 6/2005 | Yamasaki et al. | 709/200 |
| 2006/0047813 A1* | 3/2006 | Aggarwal et al. | 709/226 |
| 2006/0294238 A1* | 12/2006 | Naik et al. | 709/226 |

FOREIGN PATENT DOCUMENTS

| | | |
|---|---|---|
| JP | 2002-024192 A | 1/2002 |
| JP | 2003-124976 A | 4/2003 |
| JP | 2006227952 A | 8/2006 |

OTHER PUBLICATIONS

Japanese Office Action dated Mar. 17, 2009 (mailing date), issued in corresponding Japanese Patent Application No. 2005-190616.

* cited by examiner

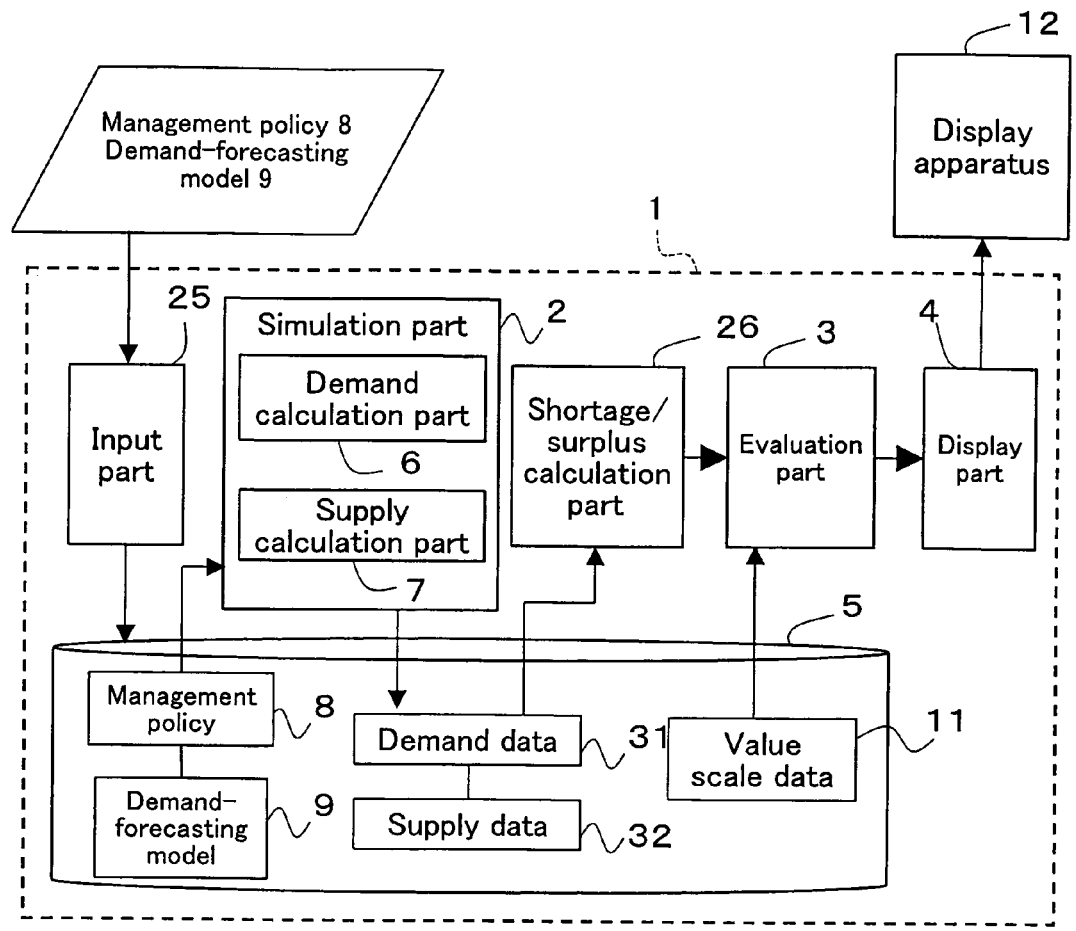

MANAGEMENT POLICY EVALUATION SYSTEM AND RECORDING MEDIUM STORING MANAGEMENT POLICY EVALUATION PROGRAM

BACKGROUND OF THE INVENTION

1. Field of the Invention

The present invention relates to a management policy evaluation system for evaluating a management policy for managing IT resources.

2. Description of Related Art

Regarding an information technology (IT) system forming the foundation of the economy and society, there is a requirement for stability, robustness, and economic efficiency. In recent years, in order to maintain the function of an IT system that is being sophisticated more and more in response to the change in an administration environment while keeping stability and robustness, the technique of autonomous processing of the system is becoming indispensable. The autonomous processing refers to that a system takes over a part of determination, which has been conducted by human beings. The autonomous processing enhances the ability of the system to respond to a load increase, a failure, and the like, and the adjustability of the system with respect to the change in a business environment.

For example, in an Internet data center (hereinafter, referred to as an "IDC"), there is a requirement for an autonomous control for the optimum use of an IT resource. The IDC is a facility for taking care of an IT resource of a server, a storage, a network, and the like managed by a manager and supplies a connection line to the Internet, maintenance, operation service, and the like. The manager conducts business by offering service to a user using the IT resource.

FIG. 14 is a schematic view showing a system configuration of a general IDC. In the IDC, corporations A, B, and C that are managers manage IT resources 91, 92, and 93, respectively. Users 94 can use various services offered by the IT resources 91, 92, and 93.

In particular, the IDC capable of increasing/decreasing an IT resource managed by a corporation in accordance with, for example, needs of a user on demand is called an IDC of a utility system. By setting the IDC to be of a utility system, an IT resource of each manager can be used efficiently in accordance with a changing business environment. It is necessary for a corporation managing an IT resource to increase/decrease the IT resource efficiently so as to make the maximum profit with a minimum investment in the IT resource.

For example, as disclosed by JP 2003-124976 A, a method for effectively using an IT resource on demand has been proposed. According to this method, when the load of a user varies in a data center, the assignment of a resource with respect to the user is dynamically changed in accordance with the load.

SUMMARY OF THE INVENTION

However, according to the above-mentioned conventional method, the assignment of an IT resource is changed automatically in accordance with a variation in the load of a user. Therefore, it is impossible to assign an IT resource flexibly in accordance with a business policy or a business environment of a manager of the IT resource. In order to increase/decrease an IT resource flexibly in accordance with a business policy or a business environment of a manager, a management policy is used effectively for managing the IT resource. The management policy is data describing a rule for the management of an IT resource. The management policy indicates, for example, requirements to increase/decrease an IT resource and a way of the increase/decrease. The management policy is data set mainly by a manager of an IT resource. By setting the management policy appropriately in light of a business environment, a business policy, and the like, a manager can manage an IT resource efficiently to make a profit.

Examples of the management policy include various conditions set as follows: "when a CPU load becomes more than 90%, one server is added to a system", "when a CPU load becomes more than 70%, one server is added to a system", and the like. Such a management policy is merely a condition for the management of an IT resource. Thus, a manager needs information of, for example, which management policy should be used for the management of an IT resource to achieve the highest sales or profit, that is, information for judging value to be created by the management of an IT resource based on a management policy.

Therefore, with the foregoing in mind, it is an object of the present invention to provide a management policy evaluation system and a management policy evaluation program that enable quantification of value to be created by the management of an IT resource based on a management policy.

A management policy evaluation system constituted by a computer according to the present invention evaluates a management policy that establishes a rule for assigning an IT resource to be provided in a system that offers service to a user, in accordance with a state of use by the user. The evaluation system includes: a demand recording part for recording demand data representing a change in a value of a demand for the service from the user in a predetermined period, the value of the demand being expressed as an operating amount of the IT resource; a supply recording part for recording supply data representing a change in a value of a supply of the service to be provided by the IT resource to be assigned based on the management policy in the predetermined period, the value of the supply being expressed as the operating amount; a calculation part for comparing the demand data recorded in the demand recording part with the supply data recorded in the supply recording part, so as to calculate shortage/surplus data representing a change in shortage/surplus of the IT resource with respect to the demand in the predetermined period; and an evaluation part for generating evaluation data representing a loss or a profit to be created when the IT resource is assigned based on the management policy in the predetermined period, by using the shortage/surplus data calculated by the calculation part.

The "IT resource" refers to hardware and/or software for implementing a system. Examples of the IT resource include a server, middleware, a network, a storage, various terminals (a personal computer, a PDA, a mobile telephone, etc.), a RFID tag, and the like.

The shortage/surplus data calculated by the calculation part represent shortage/surplus in the ability of the IT resource of the system to be managed based on the management policy to cope with the demand from the user. In other words, the shortage/surplus data represent a degree of agreement between a change in an amount of the IT resource operated in the system and the change in the demand from the user of the service offered by the system. Namely, the shortage/surplus data represent operation efficiency of the IT resource operated in the system based on the management policy. When the shortage/surplus represented by the shortage/surplus data becomes large, the service cannot be offered efficiently and accordingly a profit worsens, which results in a loss. On the other hand, when the shortage/surplus becomes small, the service can be offered efficiently and accordingly a profit increases. The evaluation part can generate the evaluation data representing a business loss or profit to be created when the management policy is used for the assignment of the IT resource, based on the shortage/surplus data. In this manner, the evaluation part generates the evaluation data that serve as a business index based on the operation efficiency of the IT resource operated in the system. Consequently, value to be created by the management of the IT resource based on the management policy can be quantified.

A management policy evaluation program stored on a recording medium according to the present invention allows a computer to execute processing of evaluating a management policy that establishes a rule for assigning an IT resource to be provided in a system that offers service to a user, in accordance with a state of use by the user. The management policy evaluation program allows the computer to execute: calculation processing of comparing demand data representing a change in a value of a demand for the service from the user in a predetermined period, the value of the demand being expressed as an operating amount of the IT resource, with supply data representing a change in a value of a supply of the service to be provided by the IT resource to be assigned based on the management policy in the predetermined period, the value of the supply being expressed as the operating amount, so as to calculate shortage/surplus data representing a change in shortage/surplus of the IT resource with respect to the demand in the predetermined period; and evaluation processing of generating evaluation data representing a loss or a profit to be created when the IT resource is assigned based on the management policy in the predetermined period, by using the shortage/surplus data calculated by the calculation processing.

According to the present invention, it is possible to provide a management policy evaluation system and a management policy evaluation program that enable quantification of value to be created by the management of an IT resource based on a management policy.

BRIEF DESCRIPTION OF THE DRAWINGS

FIG. 2A is a functional block diagram showing a configuration of the management policy evaluation system 1. FIG. 2B is a diagram showing an example of a data structure of a demand-forecasting model 9. FIG. 2C is a diagram showing an example of a data structure of value scale data 11.

DETAILED DESCRIPTION OF THE INVENTION

Figure 1A:
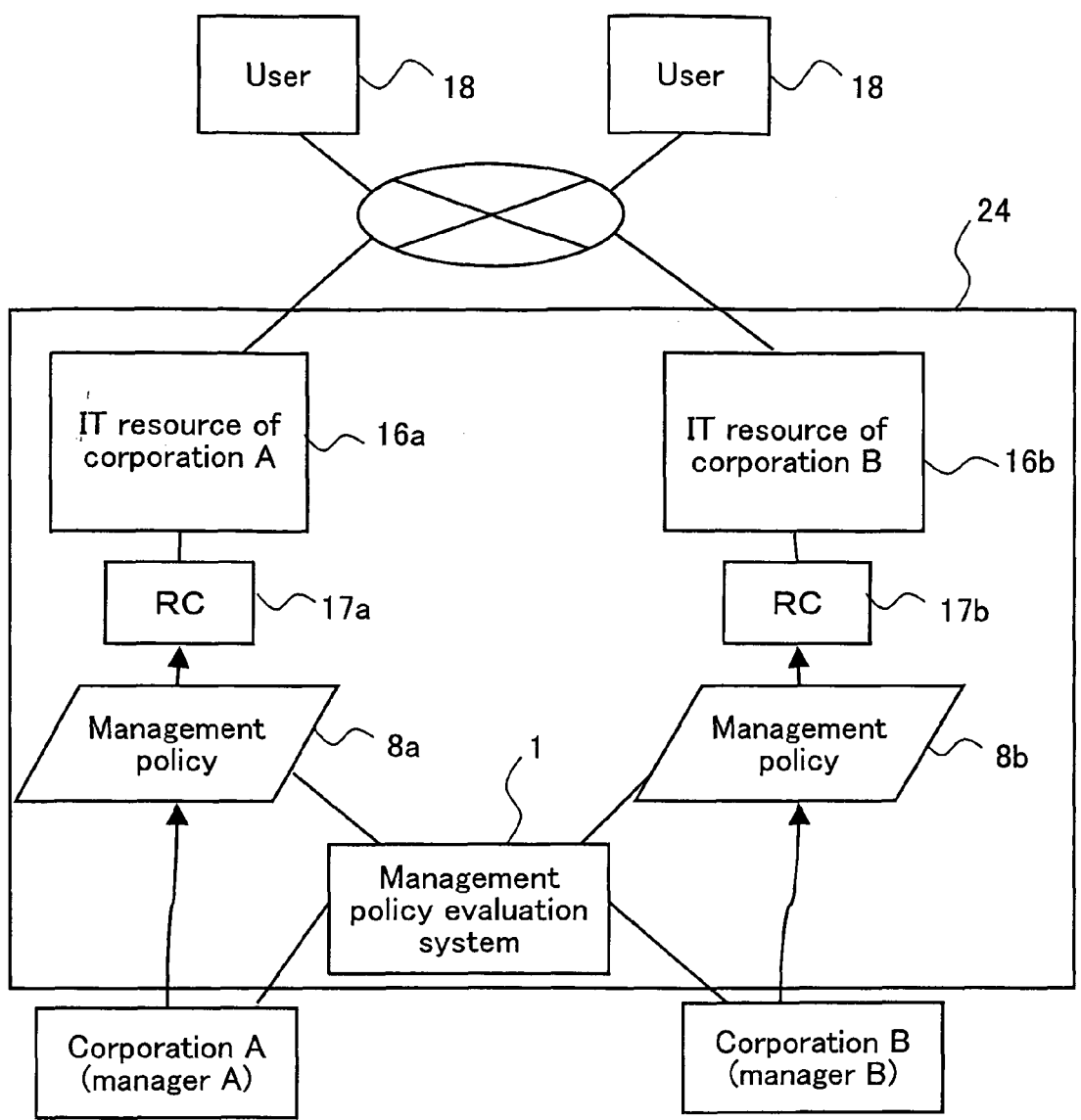
FIG. 1A is a schematic view showing a system configuration of an IDC of a utility system.

Preferably, in the management policy evaluation system according to the present invention, the demand data are obtained by simulation based on a demand-forecasting model that is data representing a pattern of the change in the demand for the service from the user.

By using the demand data obtained by simulation, the calculation part can calculate the shortage/surplus data representing a forecasted change in shortage/surplus of the IT resource with respect to the demand in a predetermined period in the future. Therefore, the evaluation part can forecast a loss or a profit to be created when the IT resource is assigned based on the management policy in the predetermined period in the future.

Preferably, in the management policy evaluation system according to the present invention, the demand data are generated based on log data representing the state of use of the service by the user or an operating state of the IT resource, and the supply data are generated based on the log data.

The demand data, which are generated based on the log data, represent, for example, a change in the state of use of the system by the user or a change in an operating amount of the IT resource required to cope with the state of use. The supply data, which are generated based on the log data, represent, for example, a change in an available operating amount of the IT resource assigned in accordance with the state of use of the system by the user. The calculation part compares the demand data with the supply data, so as to calculate the shortage/surplus data representing shortage/surplus of the IT resource actually operated in the system with respect to an actual demand. Therefore, the evaluation part can generate the evaluation data representing a loss or a profit to be created in the system in which the IT resource is actually operated based on the management policy. In particular, the evaluation part can generate the evaluation data successively while the IT resource is operated.

Preferably, in the management policy evaluation system according to the present invention, the supply recording part records the supply data with respect to each of a plurality of different management policies, the calculation part calculates the shortage/surplus data with respect to each of the plurality of management policies, and the evaluation part generates the evaluation data with respect to each of the plurality of management police. Preferably, the evaluation system further includes a display part for displaying the evaluation data with respect to each of the plurality of management policies so as to allow comparison between the evaluation data.

By using the supply data with respect to the plurality of management policies, the evaluation part generates the evaluation data for each of the management policies. The display part displays the evaluation data for the plurality of management polices so that they can be compared with each other. As a result, it is possible to compare losses or profits in a plurality of cases where the different management policies are used.

Preferably, in the management policy evaluation system according to the present invention, the supply recording part records supply data representing a change in the value of the supply in the predetermined period when a plurality of different management polices are used in different periods, respectively, within the predetermined period for the assignment of the IT resource, and the evaluation part generates the evaluation data with respect to each of the plurality of management policies.

For example, in the case where a management policy applied to weekends is different from that applied to weekdays, in the case where a management policy applied when a event is held is different from that applied when no event is held, or the like, two or more different management policies are used to manage the IT resource in different periods, respectively, within the predetermined period. This allows more precise management than in the case where one management policy is used to manage the IT resource over the entire period. In the present case, the evaluation part generates the evaluation data for each of the two or more management policies. Consequently, value to be created by the management of the IT resource based on each of the two or more management policies can be quantified.

Preferably, in the management policy evaluation system according to the present invention, the evaluation part generates data representing an amount of opportunity loss as the evaluation data based on, among the shortage/surplus data, data representing a shortage in the value of the supply with respect to the value of the demand, and generates data representing an amount of over-investment as the evaluation based on, among the shortage/surplus data, data representing a surplus in the value of the supply with respect to the value of the demand.

The evaluation part calculates the amount of a loss of opportunity to acquire users due to procurement shortage of the IT resource and the amount of over-investment in the IT resource. With these values, value to be created by the management of the IT resource based on the management policy is quantified from two aspects of opportunity loss and over-investment. Therefore, the evaluation data generated by the evaluation part include information indicating a degree of opportunity loss and over-investment.

Preferably, the management policy evaluation system according to the present invention further includes a value scale data recording part for recording value scale data representing an association between the shortage/surplus data and the evaluation data, wherein the evaluation part generates the evaluation data using the value scale data recorded in the value scale data recording part.

By using the value scale data, the evaluation part can generate data representing an amount of a loss or a profit corresponding to the shortage/surplus represented by the shortage/surplus data.

Preferably, the management policy evaluation system according to the present invention further includes: a performance recording part for recording management performance data including log data representing a state of use of the service by the user or an operating state of the IT resource and profit/loss data representing an amount of a profit or a loss created in the past by the user using the service; and a scale information generation part for generating the value scale data based on the management performance data.

The scale information generation part generates the value scale data based on the management performance data of the IT resource. Therefore, the evaluation part can evaluate the management policy using the value scale data reflecting the management performance. In this manner, the evaluation part can perform an evaluation that reflects the management performance and is closer to an actual development.

Preferably, in the management policy evaluation system according to the present invention, the value scale data recording part records a plurality of value scale data in a plurality of different systems, the scale information generation part generates standard value scale data based on the plurality of value scale data, and the evaluation part generates the evaluation data using the standard value scale data.

The standard value scale data, which are generated based on the value scale data in a plurality of different systems, serve as average value scale data. The evaluation part can generate the evaluation data based on the average value scale data.

A management policy evaluation program according to the present invention allows a computer to execute processing of evaluating a management policy that establishes a rule for assigning an IT resource to be provided in a system that offers service to a user, in accordance with a state of use by the user. The management policy evaluation program allows the computer to execute: calculation processing of comparing demand data representing a change in a value of a demand for the service from the user in a predetermined period, the value of the demand being expressed as an operating amount of the IT resource, with supply data representing a change in a value of a supply of the service to be provided by the IT resource to be assigned based on the management policy in the predetermined period, the value of the supply being expressed as the operating amount, so as to calculate shortage/surplus data representing a change in shortage/surplus of the IT resource with respect to the demand in the predetermined period; and evaluation processing of generating evaluation data representing a loss or a profit to be created when the IT resource is assigned based on the management policy in the predetermined period, by using the shortage/surplus data calculated by the calculation processing.

Hereinafter, embodiments of the present invention will be described in detail with reference to the drawings.

Embodiment 1

Embodiment 1 is directed to a system for evaluating a management policy for an IT resource. The present embodiment is described by taking as an example the case where a manager of an IT resource offers mail order service to users via the Internet using the IT resource in an IDC of a utility system.

FIG. 1A is a schematic diagram showing a system configuration of an IDC 24 of a utility system. In the IDC 24 shown in FIG. 1A, IT resources 16a and 16b of corporations A and B, respectively, are managed. In the present embodiment, for example, the IT resource 16a of the corporation A includes a server, a storage, and a network for building a mail order system, and software for operating these components. A plurality of users 18 access the server included in the IT resource 16a so as to use the mail order service. When the users 18 purchase a product using the mail order service, the corporation A as a manager A can make a profit.

In the IT resources 16a and 16b of the corporations A and B, resource coordinators (hereinafter, referred to as "RCs") 17a and 17b, respectively, are deployed. For example, the RC 17a reads a management policy 8a set by the corporation A, and increases/decreases the IT resource 16a in accordance with the contents of the management policy 8a.

The management policies 8a and 8b are information indicating a managing rule set to control the systems composing the IT resources 16a and 16b, respectively. For example, in the management policies 8a and 8b, a rule is described for determining an increase/decrease of the IT resources 16a and 16b based on an operating condition of the IT resources 16a and 16b, respectively. Thus, preferably, the management policies 8a and 8b are described following an IF-THEN rule that determines that predetermined processing is performed if a predetermined condition is satisfied, or the like.

Examples of the management policy 8a include "when a CPU load becomes more than 90%, one server is added to the mail order system", "when a CPU load becomes more than 70%, one server is added to the mail order system", and the like. The IT resources 16a and 16b are managed efficiently by increasing/decreasing the same based on the management policies 8a and 8b, respectively.

A management policy evaluation system 1 reads the management policies 8a and 8b, and calculates evaluation data. The managers A and B can obtain the evaluation data as information for judging how the set management policies 8a and 8b, respectively, contribute to sales or a profit.

Figure 1B:
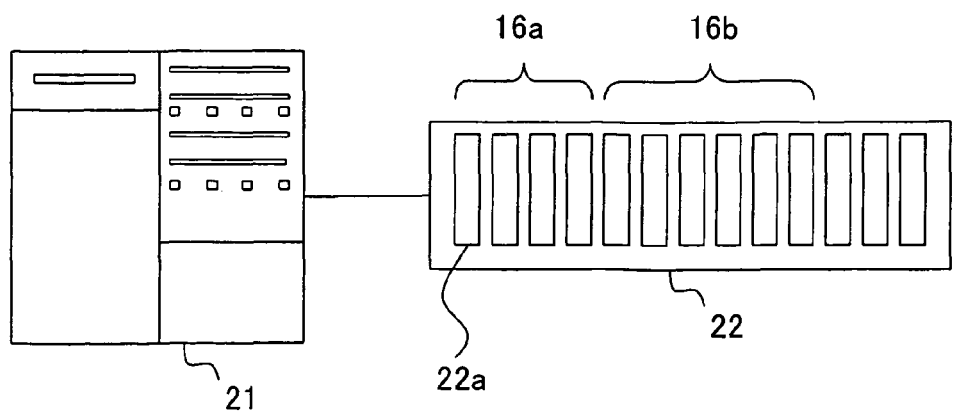
FIG. 1B is a diagram showing an example of a physical configuration of a management policy evaluation system 1 and IT resources 16a and 16b.

FIG. 1B is a diagram showing an example of a physical configuration of the management policy evaluation system 1 and the IT resources 16a and 16b. As shown in FIG. 1B, the management policy evaluation system 1 and the IT resources 16a and 16b are composed of, for example, a blade server 22 including a plurality of server blades 22a, and a deployment server 21 for managing the blade server 22. The blade server 22 and the deployment server 21 are connected to each other, for example, through a LAN or the like. The management policy evaluation system 1 can be configured on the deployment server 21. For example, the plurality of server blades 22a in the single blade server 22 are assigned to the IT resource 16a of the corporation A and the IT resource 16b of the corporation B. The RCs 17a and 17b can be operated on the deployment server 21.

For example, when one server is added to the mail order system composed of the IT resource 16a, one of the server blades 22a in the blade server 22 is additionally assigned to the IT resource 16a of the corporation A. The IT resources 16a and 16B can also be composed of independent blade servers that are physically independent of each other.

FIG. 2A is a functional block diagram showing a configuration of the management policy evaluation system 1. The management policy evaluation system 1 includes an input part 25, a simulation part 2, a shortage/surplus calculation part 26, an evaluation part 3, a display part 4, and a recording part 5. The display part 4 is connected with an external display apparatus 12.

The input part 25 receives externally a demand-forecasting model 9 and a management policy 8 to be evaluated, and records the same in the recording part 5. The management policy 8 is data set by the manager A, for example.

FIG. 2B is a diagram showing an example of a data structure of the demand-forecasting model 9. The demand-forecasting model 9 include, for example, information indicating time periods and information indicating the number of accesses from users in each of the time periods. The demand-forecasting model 9 may be created based on, for example, a management performance achieved by the management of the IT resource in the past.

The simulation part 2 includes a demand calculation part 6 and a supply calculation part 7. By using the demand-forecasting model 9 recorded in the recording part 5, the demand calculation part 6 calculates demand data 31 representing a change in a value of a demand for the mail order system composed of the IT resource 16a in a predetermined period, the value of the demand being expressed as an operating amount of the IT resource 16a. For example, the demand value is expressed as an operating amount of the IT resource 16a that is changed in accordance with a state of use of the mail order system. Examples of the demand value include the number of accesses to the server of the mail order system, a CPU use amount, an amount of transferred data, and the like. The demand data 31 obtained by the demand calculation part 6 are recorded in the recording part 5.

The supply calculation part 7 calculates supply data 32 using the demand-forecasting model 9 and the management policy 8 recorded in the recording part 5. The supply data 32 represents a change in a value of a forecasted supply of the service to be provided by the IT resource 16a to be assigned based on the management policy 8 in the predetermined period, the value of the supply being expressed as an operating amount of the IT resource 16a. For example, the supply value is expressed as an operating amount that is changed in accordance with an amount of the assigned IT resource 16a. Preferably, the supply value is expressed in the same unit as that of the demand value. Examples of the supply value include the number of accesses that can be handled by the server as the IT resource 16a assigned based on the management policy 8, a possible use amount of a CPU, an amount of data that can be transferred, and the like. The supply data 32 obtained by the supply calculation part 7 are recorded in the recording part 5.

The shortage/surplus calculation part 26 compares the demand data 31 and the supply data 32 recorded in the recording part 5 so as to calculate shortage/surplus data. The shortage/surplus data represent, for example, a difference between the demand for the mail order system composed of the IT resource 16a and the supply of the IT resource 16a assigned based on the management policy 8. An example of the shortage/surplus data includes data representing a change in a difference or a ratio between the demand value represented by the demand data 31 and the supply value represented by the supply data 32 in the predetermined period.

Based on the shortage/surplus data calculated by the shortage/surplus calculation part 26, the evaluation part 3 generates evaluation data representing a loss or a profit to be created when the IT resource 16a is managed based on the management policy 8. When generating the evaluation data, the evaluation part 3 refers to value scale data 11 recorded in the recording part 5.

The display part 4 displays the evaluation data generated by the evaluation part 3 on the external display apparatus 12 in a visible form suitable for interpretation by human beings.

The management policy evaluation system 1 can be configured on, for example, a computer such as a personal computer, a server, and the like, as well as the deployment server 21 as mentioned above. The function of each of the input part 25, the simulation part 2, the shortage/surplus calculation part 26, the evaluation part 3, and the display part 4 can be realized when a CPU of a computer executes a predetermined program. As the recording part 5, a portable recording medium such as a flexible disk and a memory card, a recording medium in a recording apparatus provided on a network, or the like, as well as a recording medium such as a hard disk and a RAM stored in a computer can be used.

The management policy evaluation system 1 can be composed of the single deployment server 21 as shown in FIG. 1B, or can be configured in such a manner that the function is distributed by a plurality of servers.

Figure 3:
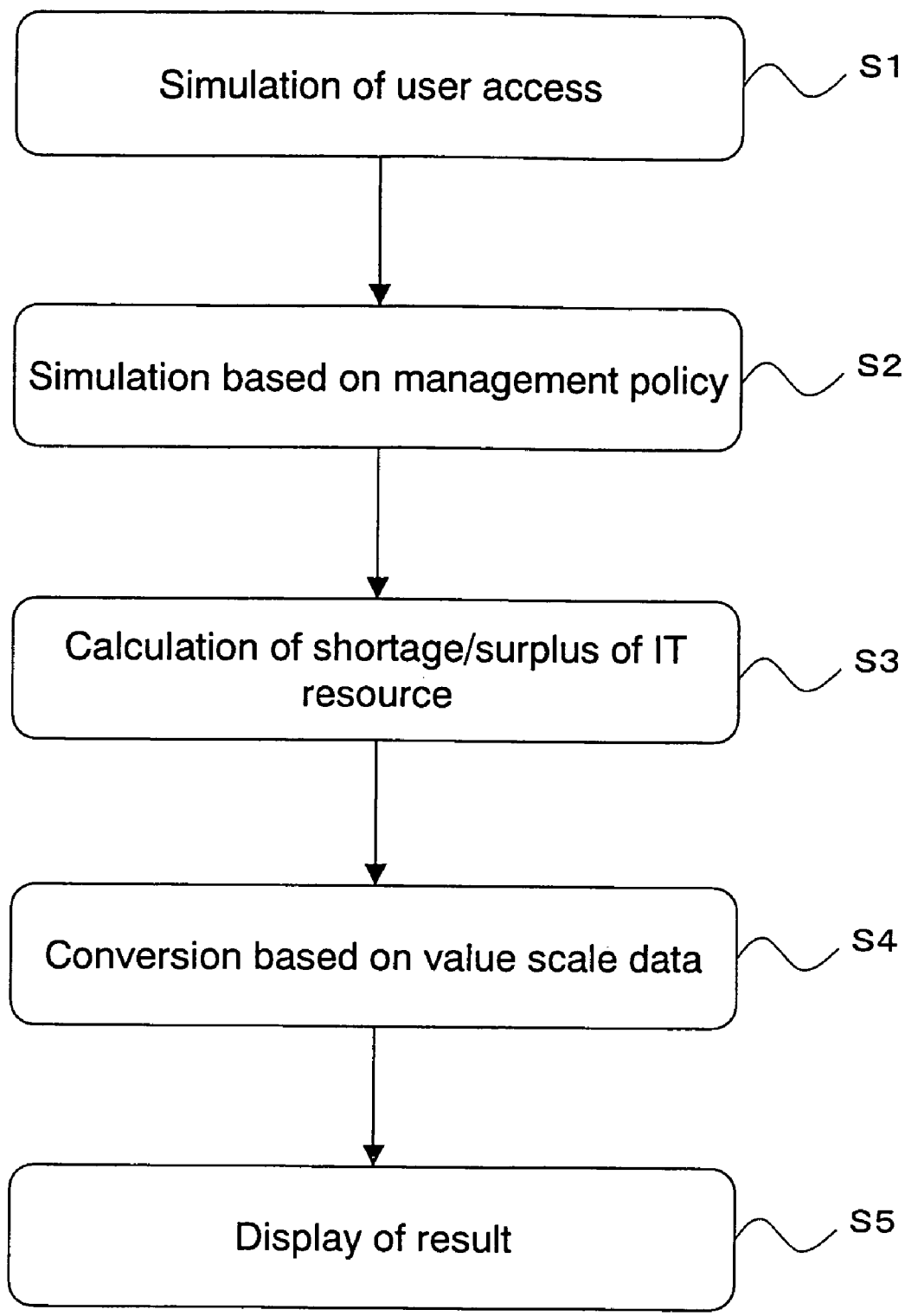
FIG. 3 is a flow chart showing processing for evaluating a management policy 8.

Next, an operation of the management policy evaluation system 1 will be described. FIG. 3 is a flow chart showing processing of the management policy evaluation system 1 for evaluating the management policy 8 for use in the management of the IT resource 16*a*.

As shown in FIG. 3, initially the demand calculation part 6 obtains the demand data 31 by simulation based on the demand-forecasting model 9 (Step S1). The following description is directed to the case where as the demand data 31, a change in the number of accesses to the server of the mail order system from users in a predetermined period, for example, is obtained. Examples of the demand data 31 include an amount of transferred data such as stream data, a CPU use ratio, and the like, as well as the number of accesses. When the service offered by the IT resource 16*a* is, for example, an IP telephone or the like, a band, the number of lines, or the like can also be used as the demand value.

Figure 4:
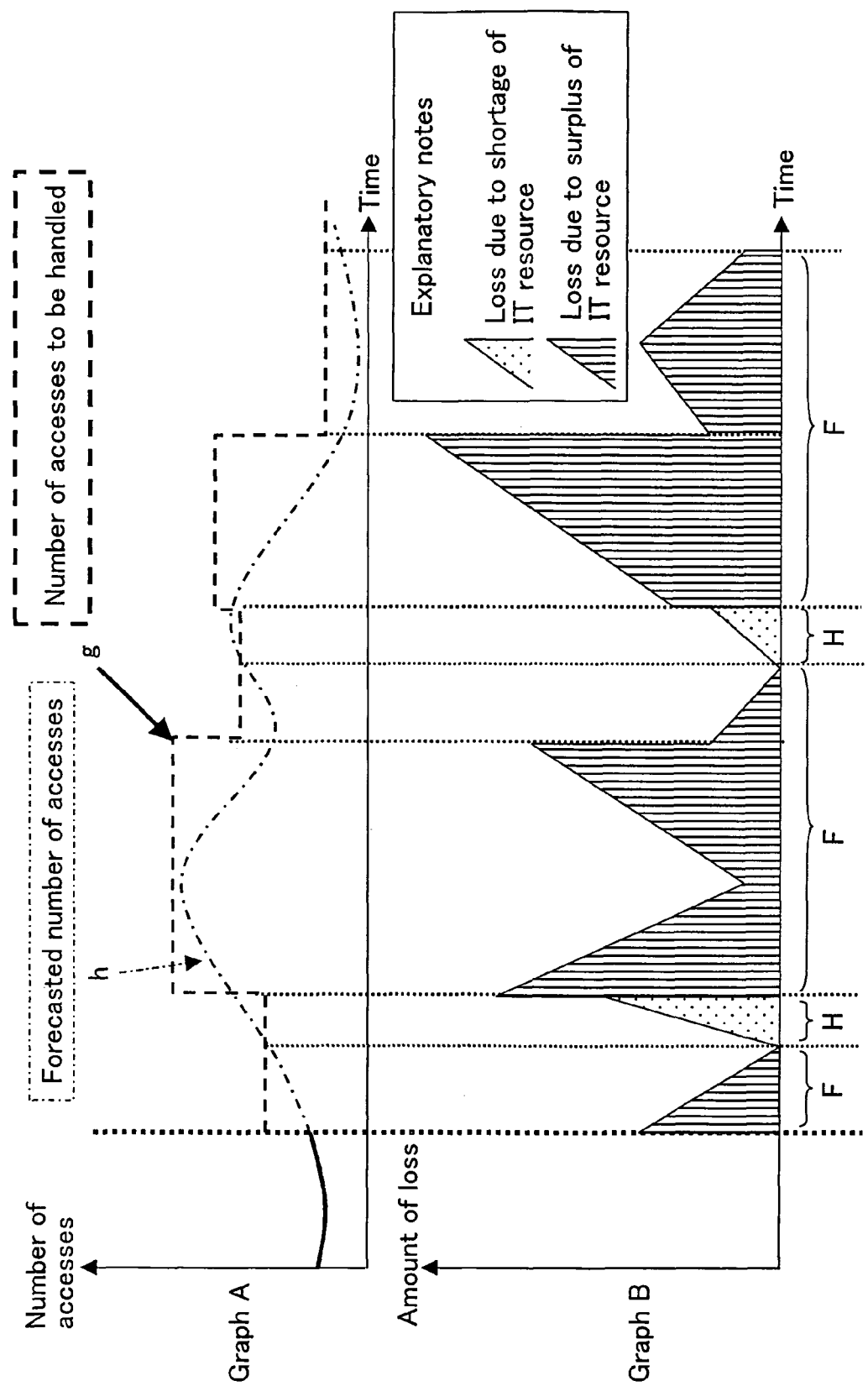
FIG. 4 is a graph schematically showing examples of changes in the number of accesses from users and the number of accesses that can be handled by a server, and an example of a shortage and a surplus of the IT resource.

FIG. 4 is a graph schematically showing examples of changes in the number of accesses from users and the number of accesses that can be handled by the server, and an example of an amount of a loss due to a shortage and a surplus of the IT resource 16*a*. In a graph A shown in FIG. 4, a curved line represented with an alternate long and short dash line h indicates a forecasted value of the change in the number of accesses calculated by the demand calculation part 6. In the graph A, a vertical axis represents the number of accesses, and a horizontal axis represents time. In a graph B, a vertical axis represents the amount of a loss, and a horizontal axis represents time. In FIG. 4, the time represented by the horizontal axis in the graph A and that represented by the horizontal axis in the graph B are the same.

Next, the supply calculation part 7 obtains the supply data 32 based on the demand-forecasting model 9 and the management policy 8 (Step S2). For example, when the management policy 8 includes the description that "when the number of accesses per hour exceeds xx, one server is additionally assigned to the mail order system", a server is added as the number of accesses per hour increases. As a result, the number of accesses that can be handled, that is, an available supply amount of the mail order service to be provided by the server increases. In this manner, the available supply amount is changed in accordance with the change in the demand. The supply calculation part 7 can calculate the change in the available supply amount as the supply data 32 based on the demand-forecasting model 9 and the management policy 8. A line represented with a broken line g in the graph A shown in FIG. 4 indicates the change in the number of accesses that can be handled by the server, which is an example of the supply data 32.

As described above, when the demand indicated by the demand-forecasting model 9 changes with time, the supply calculation part 7 obtains the change in the number of accesses that can be handled by the server to be assigned based on the management policy 8. In Step S1, the demand data 31 of users are obtained in the unit of the number of accesses. Thus, preferably, the available supply amount of the mail order service to be provided by the server, which is calculated as the supply data 32, is also expressed in the unit of the number of accesses in Step S2. When the demand value obtained in Step S1 is expressed in the unit of an amount of stream data, a CPU use ratio, a band, the number of lines, or the like, the supply value is preferably calculated in the unit of the amount of stream data, the CPU use ratio, the band, the number of lines, or the like, respectively.

Then, the shortage/surplus calculation part 26 obtains the shortage/surplus data (Step S3). The shortage/surplus data are expressed as, for example, a change in a difference between the number of accesses from users obtained in Step S1 and the number of accesses that can be handled by the server obtained in Step S2. More specifically, when the available supply amount of the mail order service to be provided by the server is less than the access from users, the shortage/surplus calculation part 26 calculates a shortage. When the available supply amount is more than the access from users, the shortage/surplus calculation part 26 calculates a surplus. In the present embodiment, when the number of accesses from users is larger than the number of accesses that can be handled by the server, the difference between the numbers of accesses is calculated as a shortage. On the other hand, when the number of accesses that can be handled by the server is larger than the number of accesses from users, the difference between the numbers of accesses is calculated as a surplus.

The evaluation part 3 applies the value scale data 11 to the shortage and the surplus obtained in Step S3 so as to convert the shortage and the surplus into information for use in business judgment, such as, for example, a loss, sales, a profit, the number of acquired customers, or the like (Step S4). In the present embodiment, the description is directed to the case where, for example, the shortage and the surplus are converted into information indicating a loss, i.e., an amount of a loss.

The value scale data 11 will be described below. The value scale data 11 are a collection of data in which each of various values representing the shortage or the surplus is accumulated along with an associated amount of a loss.

FIG. 2C is a diagram showing an example of a data structure of the value scale data 11. For example, an amount of a loss of "minus 100,000 yen" is accumulated in association with an access shortage of "100". Further, an amount of a loss of "minus 50,000 yen" is accumulated in association with an access surplus of "100".

When the shortage is "100" at a certain time, the evaluation part 3 refers to the value scale data 11, and obtains an amount of a loss of "minus 100,000 yen" accumulated in association with a shortage of "100". Further, when the surplus is "100" at a certain time, the evaluation part 3 obtains an amount of a loss of "minus 50,000 yen" accumulated in association with a surplus of "100" from the value scale data 11. In this manner, the evaluation part 3 can convert the shortage or the surplus of the IT resource 16*a* into quantified information that serves as a management index, such as an amount of a loss.

As described above, the value scale data 11 are provided so as to associate the shortage/surplus of the available supply amount of the service to be provided by the IT resource 16*a* with respect to an amount of the demand from users with the quantified information that serves as a management index (e.g., an amount of a loss). The amount of a loss accumulated in the value scale data 11 can be obtained based on the following concept, for example.

The management of the IT resource 16*a* based on a certain management policy 8 involves a risk of over-investment and a risk of opportunity loss. When the demand from users of the IT resource 16*a* is lower than the capacity of the IT resource 16*a* controlled based on the management policy 8, a loss due to over-investment is caused. In such a case, the management policy 8 is evaluated as causing "a loss involving a risk of over-investment".

On the other hand, when the capacity of the IT resource 16a is set lower based on the management policy 8, there is a case where the IT resource 16a cannot catch up with a sharp increase in demand and accordingly service with low responsiveness is offered to users. Such degradation in the service performance damages service user confidence. Consequently, the users may select alternative means, which results in a loss of purchase opportunity, for example. In such a case, the management policy 8 is evaluated as causing "a loss involving a risk of opportunity loss".

In the present embodiment, the evaluation part 3 uses the value scale data 11 so as to perform the above-mentioned evaluation based on the result of the simulation by the simulation part 2. For example, as a result of the simulation of the management of the IT resource 16a based on a certain management policy 8, the following value scale is determined based on the value scale data 11: "when the possibility of an acquisition loss of 100 users is suggested, there is a loss of 100,000 yen in sales". Preferably, the value scale data 11 are set in accordance with a business environment of each manager.

In the present embodiment, the value scale data 11 associate the shortage in the number of accesses that can be handled by the server with respect to the demand with an amount of a loss due to opportunity loss and associate the surplus with an amount of a loss due to over-investment. Therefore, by referring to the value scale data 11, the evaluation part 3 can obtain the amount of a loss due to opportunity loss and the amount of a loss due to over-investment based on the shortage and the surplus, respectively.

The graph B in FIG. 4 shows a change in the amount of a loss obtained by the evaluation part 3. The evaluation part 3 obtains the change in the amount of a loss based on the difference between the number of accesses from users, which is represented by the curved line h, and the number of accesses that can be handled by the server, which is represented by the broken line g in the graph A.

In the graph B, in a period H, the number of accesses h from users exceeds the number of accesses g that can be handled by the server. With respect to the period H, an amount of a loss caused by shortage of the IT resource 16a, that is, the amount of a loss due to opportunity loss is shown. In a period F, the number of accesses g that can be handled by the server exceeds the number of accesses h from users. With respect to the period F, an amount of a loss caused by surplus of the IT resource 16a, that is, the amount of a loss due to over-investment is shown.

The change in the amount of a loss as shown in the graph B is obtained when the IT resource 16a is managed based on the management policy 8. By using the data showing the change in the amount of a loss, the evaluation part 3 can further obtain, for example, a total amount of a loss, a ratio between the loss due to over-investment and the loss due to shortage of the IT resource, and the like. These data on the amount of a loss generated by the evaluation part 3 serve as the evaluation data for the management policy 8.

The management policy evaluation system 1 may perform the processing in Steps S1 to S4 shown in FIG. 3 with respect to, for example, a plurality of management policies A, B, and C, so as to generate the evaluation data for each of the plurality of management policies A, B, and C.

Figure 5:
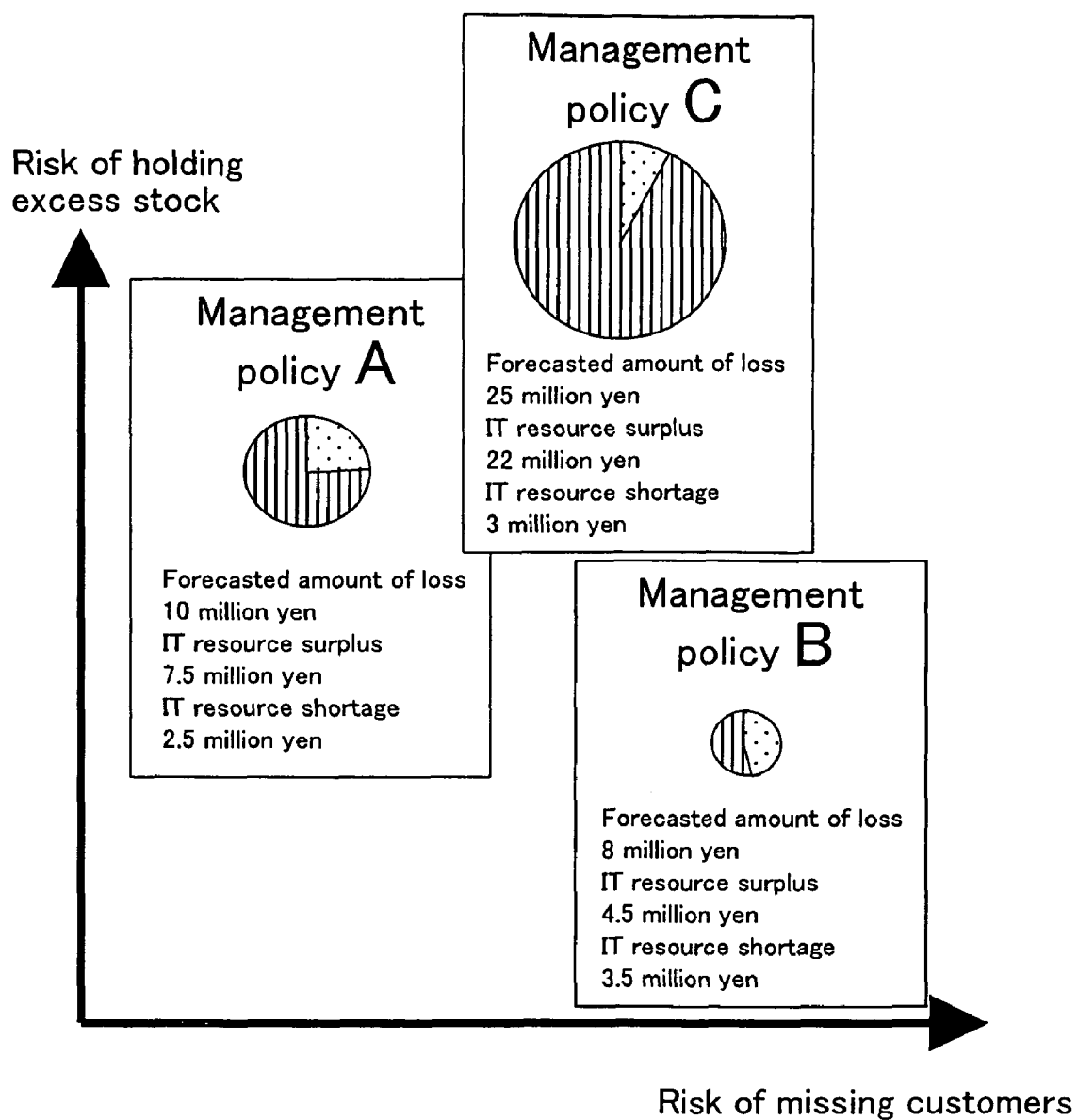
FIG. 5 is a diagram showing an example of a display of evaluation results.

The display part 4 displays the evaluation data for the management policies A, B, and C generated by the evaluation part 3 on the display apparatus 12 (Step S5). FIG. 5 is a diagram showing an example of the display of the evaluation results.

In the example shown in FIG. 5, the evaluation results for the management policies A, B, and C, respectively, are displayed on a graph. In the graph, a vertical axis represents the amount of a loss due to over-investment, and a horizontal axis represents the amount of a loss due to opportunity loss. The evaluation result for each of the management policies A, B, and C is arranged on the graph in accordance with the amount of a loss due to opportunity loss and the amount of a loss due to over-investment. According to this display, it can be seen from the display position of the management policy A on the graph that the management of the IT resource 16a based on the management policy A involves a low risk of missing service users, but involves a high risk of surplus of the IT resource, for example.

As the evaluation result of each of the management policies A, B, and C, the amount of a loss due to shortage of the IT resource, the amount of a loss due to surplus of the IT resource, and a forecasted total amount of these losses are displayed. Further, a circle graph shows at a glance the percentage of each of the amount of a loss due to shortage of the IT resource and the amount of a loss due to surplus of the IT resource out of the total amount of the losses.

In the display shown in FIG. 5, the management policies A, B, and C are evaluated in terms of a quantified management index of the amount of a loss. Therefore, with the display as shown in FIG. 5, the manager can obtain information for judging which policy contributes to sales or a profit.

For example, the management policy A gives priority to avoid missing users of the mail-order service using the IT resource 16a. It is assumed that the management of the IT resource 16a based on the management policy A involves a high risk of surplus of the IT resources. The management policy B aims to suppress a risk of surplus of the IT resource. In the case of the management based on the management policy B, when there is a demand exceeding the capacity of the IT resource 16a to meet demands, it is impossible to increase the IT resource 16a so as to catch up with the increased demand. As a result, it is assumed that a high risk of opportunity loss is involved. Further, it is assumed that when one service is offered to an increased number of users, the total amount of the losses increases as in the case of the management based on the management policy C.

In the IDC of a utility system, the manager who offers, for example, the mail-order service using the IT resource 16a has to select either one of the risks of over-investment and opportunity loss. No business can be conducted without risk. The information indicated by the evaluation results for the management policies shown in FIG. 5 is useful for the manager to select a risk to take.

The manager selects a management policy to be adopted when actually offering the mail-order service using the IT resource 16a from the management policies evaluated as described above. The IT resource 16a is managed actually based on the selected management policy.

In the present embodiment, regarding the value scale data 11, the amount of a loss is exemplified as the quantified information that serves as a management index. However, the quantified information that serves as a management index is not limited thereto. Other examples of the quantified information that serves as a management index include sales, a profit, the number of acquired customers, and the like.

In the present embodiment, the value scale data 11 represent the losses due to opportunity loss and over-investment. On the contrary, the value scale data 11 may represent an expected profit, for example, as follows: "one new user registration with a site achieves an increase in sales of 10,000 yen per month".

In the present embodiment, the evaluation part 3 refers to the value scale data 11 so as to obtain the amount of a loss from the shortage and the surplus. However, instead of the value scale data 11, the evaluation part 3 may use, for example, a function for calculating the amount of a loss from the shortage and the surplus so as to obtain the amount of a loss.

In the present embodiment, the simulation part 2 uses the demand-forecasting model 9 so as to obtain the change in the demand from users. However, it is possible to use, for example, data based on a performance, such as data representing a change in the number of accesses to the server from users in the past, as well as the demand-forecasting model 9.

Embodiment 2

In Embodiment 1, the demand calculation part 6 uses the demand-forecasting model 9 to obtain the demand data 31, and the supply calculation part 7 uses the demand-forecasting model 9 and the management policy 8 to obtain the supply data 32. On the other hand, in the present embodiment, the demand calculation part 6 and the supply calculation part 7 use a management log indicating a state of use of the mail-order system by users to obtain the demand data 31 and the supply data 32, respectively.

Figure 6:
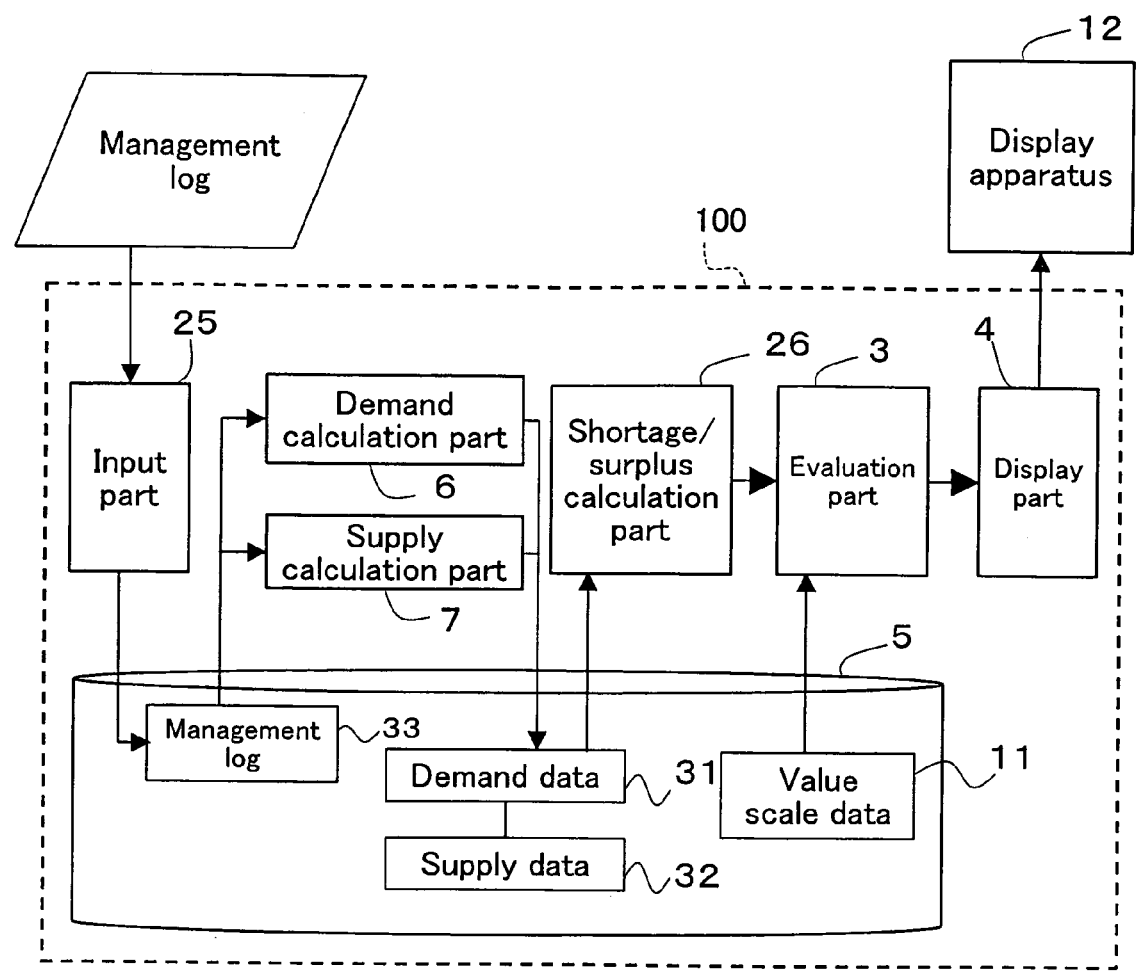
FIG. 6 is a functional block diagram showing a configuration of a management policy evaluation system 100 according to Embodiment 2.

FIG. 6 is a functional block diagram showing a configuration of a management policy evaluation system 100 according to the present embodiment. In the management policy evaluation system 100 shown in FIG. 6, the same components as those in the management policy evaluation system 1 shown in FIG. 2A are denoted with the same reference numerals, and the descriptions thereof will be omitted.

The input part 25 obtains a management log 33 from, for example, the server included in the IT resource 16a, and records the same in the recording part 5. The management log 33 is data representing a state of use of the mail-order system or an operating state of the IT resource 16a, for example. The management log 33 is created by, for example, the server offering the mail-order system to users.

The management log 33 include data representing, for example, a history of access from users to the server included in the IT resource 16a, a change in a CPU load of the server, a history of data transferred to users by the server, and the like. Examples of the management log 33 include a Web access log of a Web site of the mail-order system, and the like.

The demand calculation part 6 calculates the demand data 31 using the management log 33 recorded in the recording part 5. For example, the demand calculation part 6 extracts data as a demand value from the management log 33 so as to calculate the demand data 31. Examples of the demand value to be extracted include the number of accesses, the number of users (the number of users that can be identified as unique users), the number of accesses per user, the number of log-ins, the number of pages referred to by users, an amount of data transferred to users by the server, a CPU load of the server, and the like.

The supply calculation part 7 calculates the supply data 32 using the management log 33 recorded in the recording part 5. For example, the supply calculation part 7 extracts data as a supply value from the management log 33 so as to calculate the supply data 32. Examples of the supply value to be extracted include the capacity of a hard disk, and an amount of supplied IT resources, such as the number of CPUs.

The function of each of the shortage/surplus calculation part 26, the evaluation part 3, and the display part 4 is the same as those in Embodiment 1, and thus the descriptions thereof will be omitted.

Figure 7:
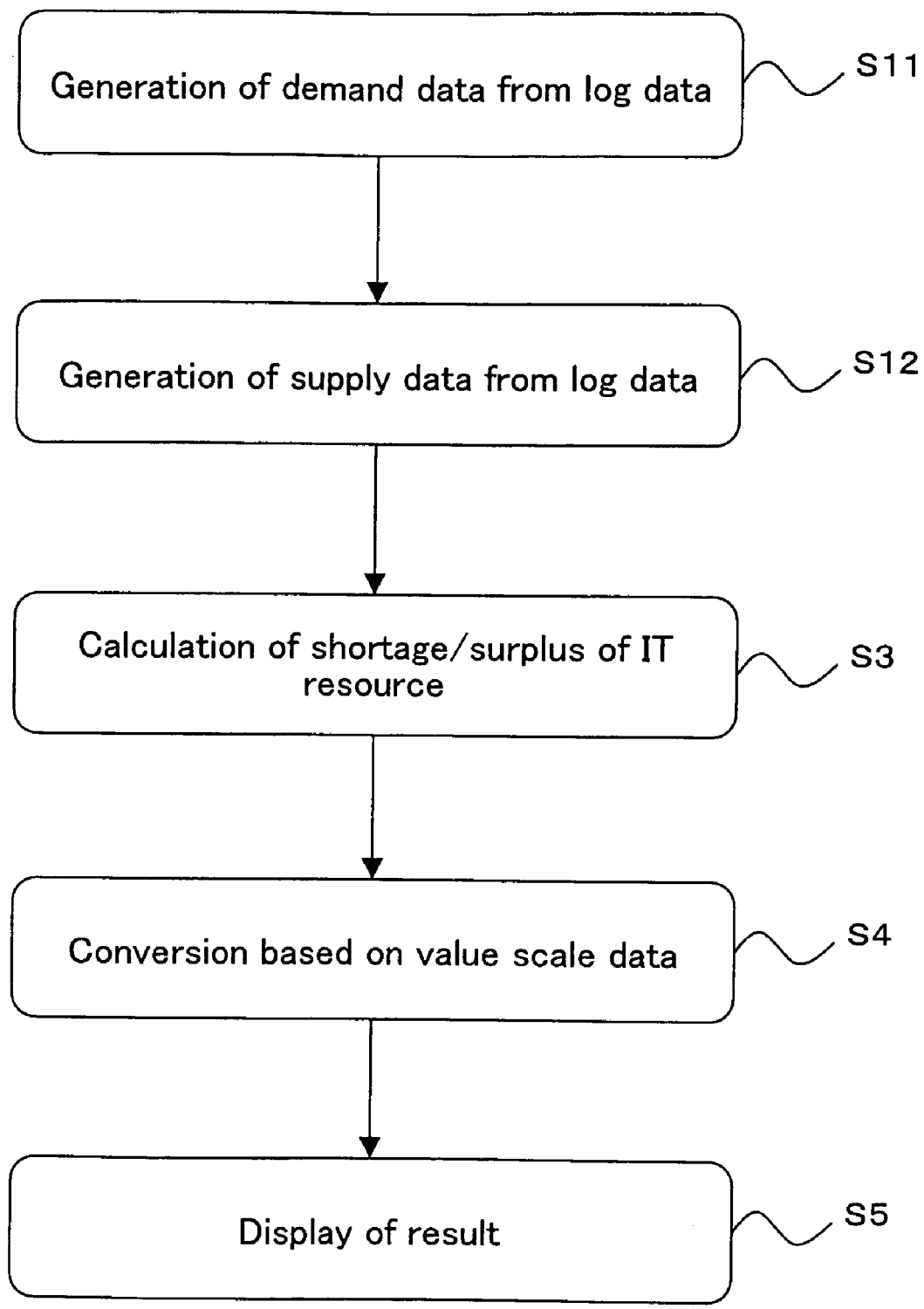
FIG. 7 is a flow chart showing processing of the management policy evaluation system 100 for evaluating the management policy 8.

Next, an operation of the management policy evaluation system 100 will be described. FIG. 7 is a flow chart showing processing of the management policy evaluation system 100 for evaluating the management policy 8 for use in the management of the IT resource 16a. In the flow chart shown in FIG. 7, the same processing steps as those in FIG. 3 are denoted with the same reference numerals, and the descriptions thereof will be omitted.

As shown in FIG. 7, initially the demand calculation part 6 obtains the demand data 31 based on the management log 33 (Step S11). For example, as the demand data 31, a change in the number of accesses from users to the server of the mail-order system in a predetermined period is obtained. The change in the number of accesses to be obtained is indicated, for example, as shown by the alternate long and short dash line h in the graph A shown in FIG. 4 as in Embodiment 1. Note here that the demand data 31 to be obtained in the present embodiment are an actual value based on the management log, although the demand data 31 obtained in Embodiment 1 are a forecasted value calculated by simulation.

Next, the supply calculation part 7 obtains the supply data 32 based on the management log 33 (Step S12). The supply data 32 to be obtained are expressed in the same form as that of the supply data 32 in Embodiment 1. The supply data 32 to be obtained are also an actual value based on the management log.

The subsequent processing in Steps S3 to S6 are the same as that in the flow chart shown in FIG. 3. Note here that the evaluation data obtained by the conversion (Step S4) based on the value scale data reflect a performance of the IT resource indicated by the management log. As the value scale data for use in Step S4, the value scale data 11 with the structure shown in FIG. 2C, for example, may be used as in Embodiment 1.

As described above, the management policy evaluation system 100 uses the demand data 31 and the supply data 32 calculated from the management log, so as to generate the evaluation data for the management policy. Therefore, by obtaining the management log successively while the mail-order system is being operated, it is possible to generate the evaluation data successively in accordance with an operating state at that time.

Embodiment 3

In Embodiment 1, the management policy evaluation system 1 evaluates the single management policy 8 when the management policy 8 is used for the management of the IT resource 16a over an entire predetermined period. On the other hand, a management policy evaluation system according to Embodiment 3 evaluates each of a plurality of management policies when the plurality of management policies are used for the management of the IT resource 16a in a predetermined period.

In order to increase/decrease the IT resource 16a in accordance with business circumstances, the IT resource 16a is managed based on a management policy. In other words, the IT resource 16a is managed based on a management policy in order to realize an on-demand business. For example, in the case where an event that attracts customers is held by means of a CM, on the Web, or the like, a management policy is set so as to increase the IT resource 16a dynamically to meet an expected increase in demand.

In such a case, preferably, the IT resource 16a is managed based on a combination of a plurality of management policies. For example, different management policies can be applied between a certain period after the event took place and a regular period other than the above period. Alternatively, different management policies can be used between weekends and weekdays.

Figure 8:
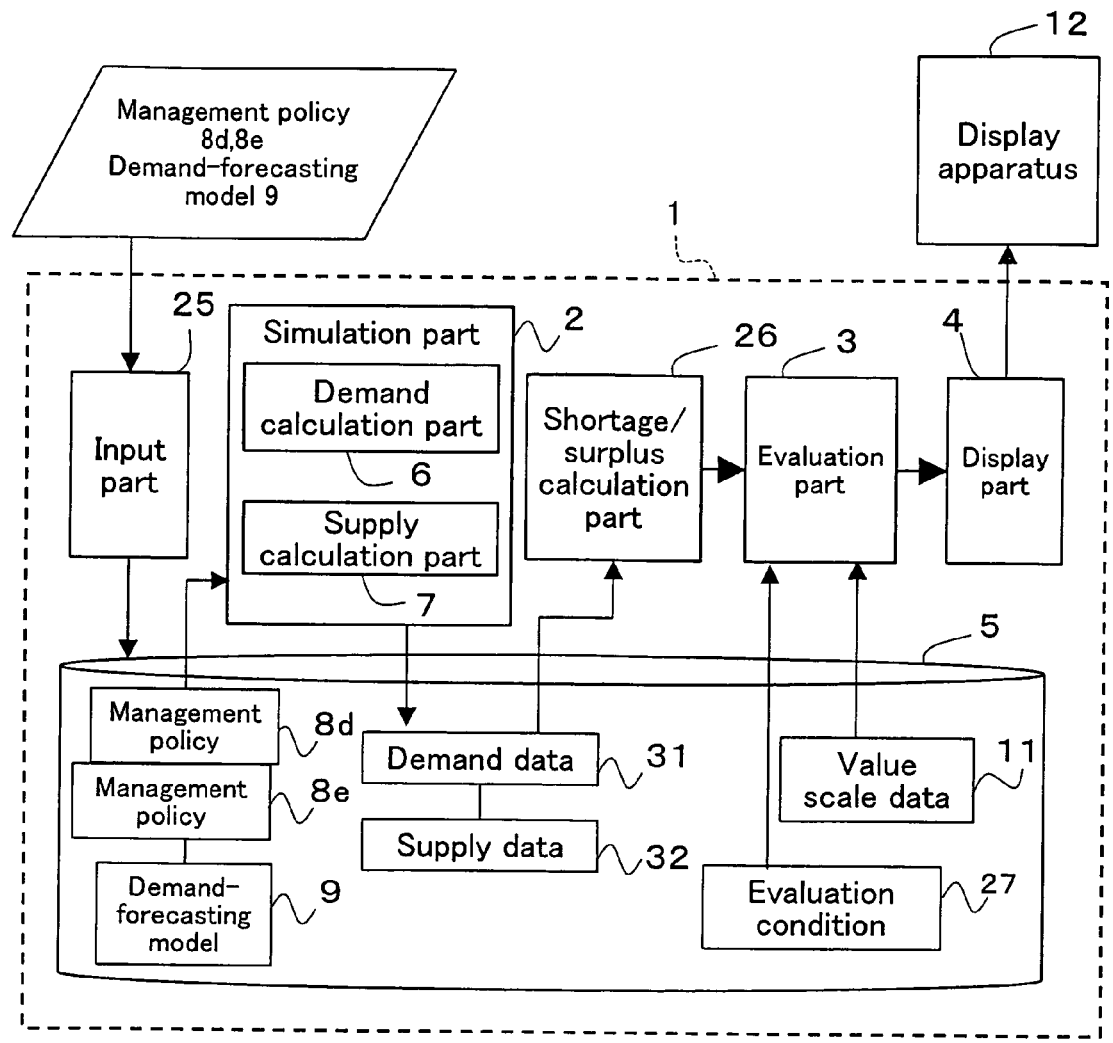
FIG. 8 is a functional block diagram showing a configuration of a management policy evaluation system 1 according to Embodiment 3.

FIG. 8 is a functional block diagram showing a configuration of a management policy evaluation system 1 according to the present embodiment. In FIG. 8, the same components as those in the management policy evaluation system 1 shown in FIG. 2A are denoted with the same reference numerals, and the descriptions thereof will be omitted. Further, the flow of processing for evaluating a management policy in the present embodiment is also the same as that shown in FIG. 3, and thus the description thereof will be omitted.

The following description is directed to processing for evaluating management policies 8d and 8e respectively when the management policies 8d and 8e are applied to the management of the IT resource 16a, as an example of the present embodiment.

The input part 25 receives the management policies 8d and 8e, and records the same in the recording part 5. The management policy 8d is applied only to a specific period (e.g., on weekends) for the management of the IT resource 16a. The management policy 8e is applied to a period other than the above (e.g., on weekdays) for the management of the IT resource 16a. The contents of the management policy 8d are different from those of the management policy 8e.

The supply calculation part 7 reads the management polices 8d and 8e recorded in the recording part 5. The supply calculation part 7 obtains by simulation a change in the number of accesses that can be handled by the server when the management policies 8d and 8e are applied to different periods, respectively, within a predetermined period for the management of the IT resource 16a.

Figure 9:
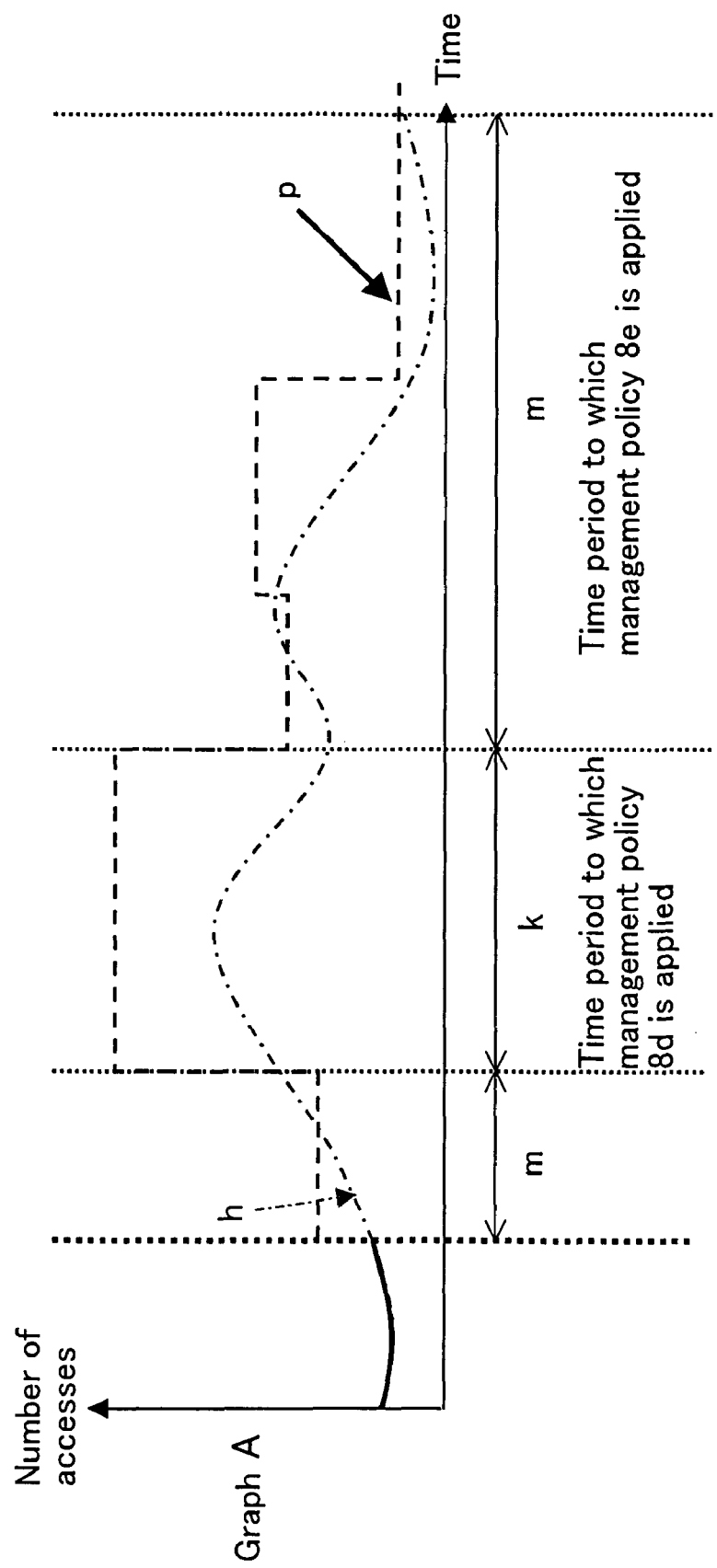
FIG. 9 is a graph showing examples of changes in the number of accesses from users and the number of accesses that can be handled by the server, which are obtained by a simulation part 2.

FIG. 9 is a graph showing examples of changes in the number of accesses from users and the number of accesses that can be handled by the server, which are obtained by the simulation part 2. In a graph A shown in FIG. 9, the number of accesses that can be handled by the server is represented by a broken line p. In the graph A, in a period m (e.g., on weekdays), the management policy 8e is applied. In a period k (e.g., on weekends), the management policy 8d is applied. Accordingly, the change in the number of accesses represented by the broken line p indicates in the period m an available supply amount of the mail-order service to be provided by the server managed based on the management policy 8e, and indicates in the period k an available supply amount of the mail-order service to be provided by the server managed based on the management policy 8d.

The shortage/surplus calculation part 26 obtains a shortage and a surplus of the IT resource 16a in the period m, and a shortage and a surplus of the IT resource 16a in the period k. The evaluation part 3 obtains amounts of a loss corresponding to the shortage and the surplus, respectively, in each of the periods k and m by referring to the value scale data 11.

When obtaining the amount of a loss, the evaluation part 3 also refers to an evaluation condition 27 recorded in the recording part 5. The evaluation condition 27 is data representing, for example, the correspondence between the periods k and m and the management policies 8d and 8e, respectively. For example, the data represents the following condition: "the evaluation data for the management policy 8d are generated from the shortage or the surplus in the period k (on weekends), and the evaluation data for the management policy 8e are generated from the shortage or the surplus in the period m (on weekdays)".

Consequently, the amount of a loss caused by the management based on the management policy 8d and the amount of a loss caused by the management based on the management policy 8e are obtained respectively. Therefore, the evaluation part 3 can evaluate the management policy 8d and the management policy 8e separately.

Embodiment 4

A management policy evaluation system 10 according to the present embodiment is used, for example, in the IDC 24 of a utility system as shown in FIG. 1 to help the managers A and B of the IT resources 16a and 16b to evaluate the management policies 8a and 8b. Although only two corporations are shown as managers in the IDC 24 in FIG. 1 for purposes of illustration, there are more managers managing their IT resources in an actual IDC. Most managers in the IDC are corporations conducting business using their IT resources. Business using an IT resource is conducted in various fields and sizes.

Figure 10:
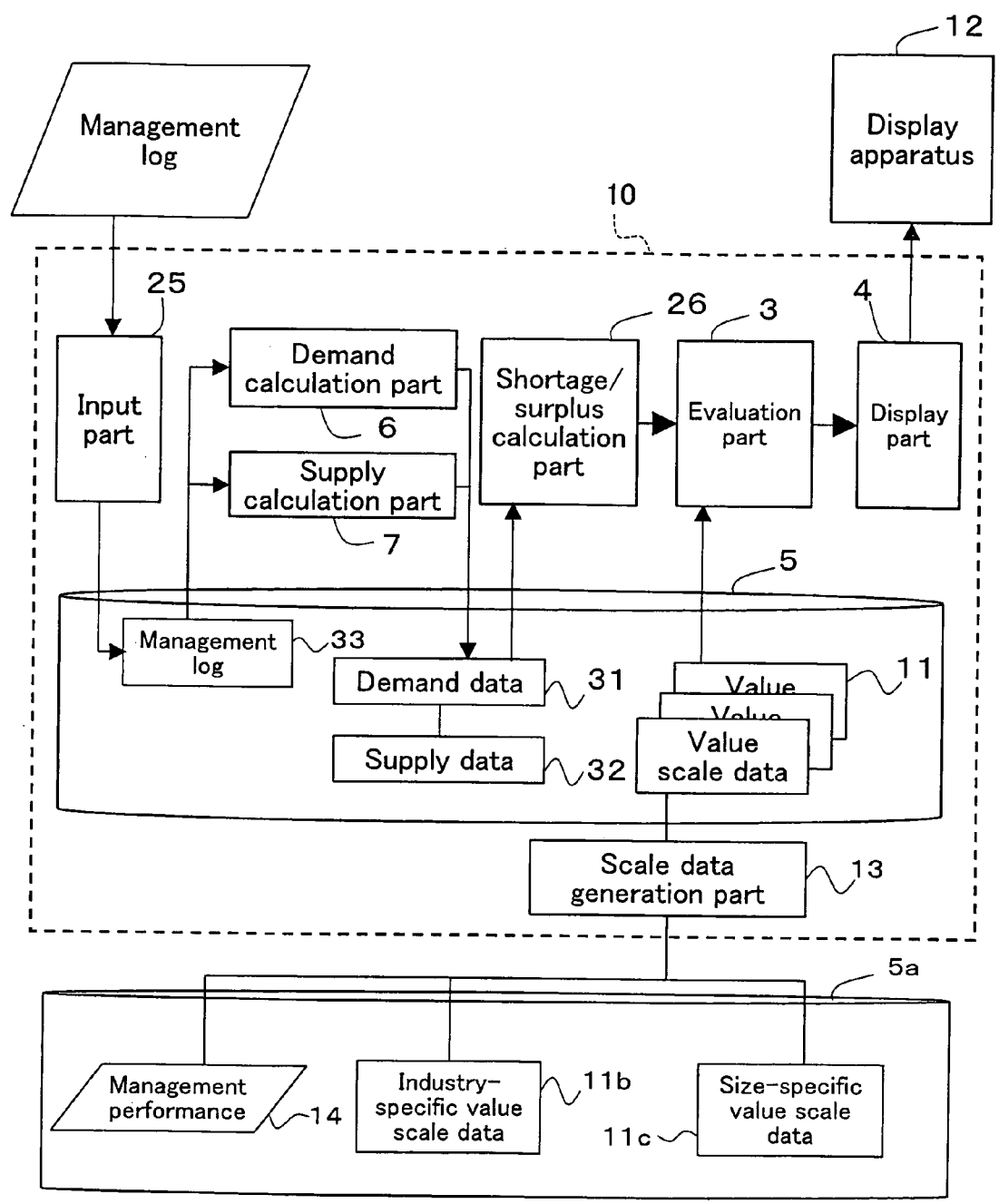
FIG. 10 is a functional block diagram showing a configuration of a management policy evaluation system 10.

FIG. 10 is a functional block diagram showing a configuration of the management policy evaluation system 10 according to the present embodiment. In the configuration shown in FIG. 10, the same components as those shown in FIG. 6 are denoted with the same reference numerals, and the descriptions thereof are not repeated.

The management policy evaluation system 10 shown in FIG. 10 further includes a scale data generation part 13. The scale data generation part 13 generates value scale data 11 based on a management performance 14 of the IT resource 16a. For example, the management performance 14 is created by the server included in the IT resource 16a, and is recorded in a recording part 5a of the IDC 24.

Preferably, the management performance 14 includes management data and business data. Preferably, the management data further include a performance value representing handling that has actually been offered by the IT resource 16a, a supply value representing an amount of handling to be offered by assigned IT resource, and the like. Examples of the performance value include the number of visitors (the number of users that can be identified as unique users), the number of visits (the number of visits per user), the number of log-ins, the number of pages referred to, an amount of transferred data, and the like. Examples of the supply value include the number of visitors, the number of visits, the number of log-ins, the number of pages to be referred to, an amount of data to be transferred, and the like that can be handled by actually assigned IT resource. For example, the management data are generated by the server of the mail-order system as a management log.

The business data include, for example, profit/loss data representing a profit or a loss created by the mail-order system composed of the IT resource 16a offering the service to users. An examples of the profit/loss data includes data representing a management index such as an amount of sales achieved by the mail-order business in the mail-order system, a stock turnover rate, and the like. The amount of sales includes, for example, an amount of sales of a specific product, an amount of sales per user, an amount of sales in a predetermined period, and the like. For example, the business data are generated by the server of the mail-order system as a sales log.

Figure 11:
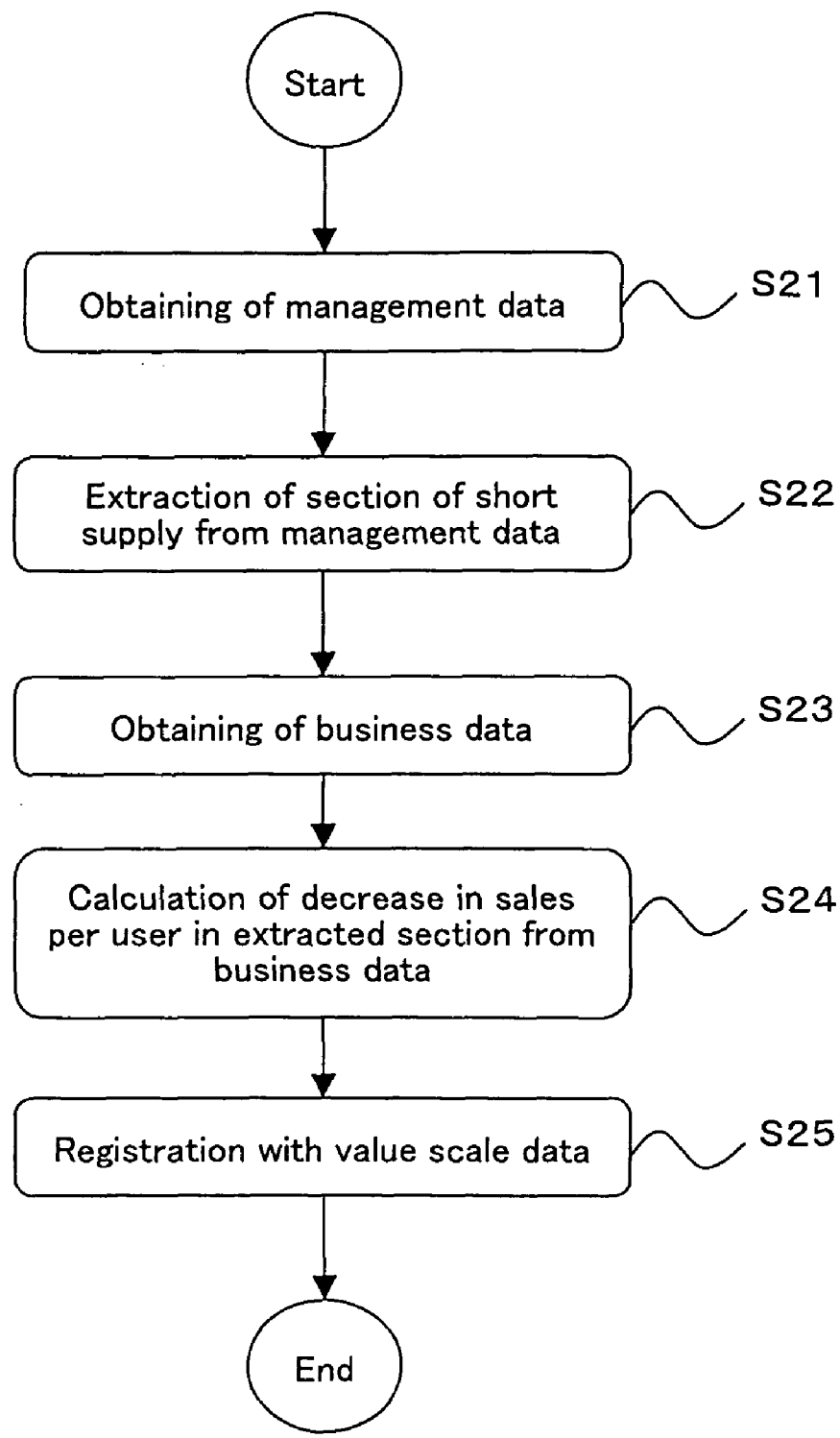
FIG. 11 is a flow chart showing an example of processing of a scale data generation part 13 for generating value scale data 11.

The following description is directed to an example of processing of the scale data generation part 13 for generating the value scale data 11 based on the management performance 14. FIG. 11 is a flow chart showing the example of the processing of the scale data generation part 13 for generating the value scale data 11.

As shown in FIG. 11, the scale data generation part 13 obtains the management data from the management performance 14 (Step S21). The management data to be obtained represent, for example, a performance in a predetermined period.

The scale data generation part 13 extracts from the management data a section in which there is a demand exceeding an amount of supply to be provided sufficiently by assigned IT resource (Step S22). It is assumed, for example, that in the section to be extracted, the demand value calculated by the demand calculation part 6 based on the management log 33 exceeds the supply value calculated by the supply calculation part 7 based on the management log 33.

The scale data generation part 13 calculates the shortage/surplus data representing shortage/surplus with respect to the demand for the IT resource in the extracted section. For example, the shortage/surplus data can represent "a ratio (%) of the IT resource to be supplied with respect to an actual demand".

Figure 12:
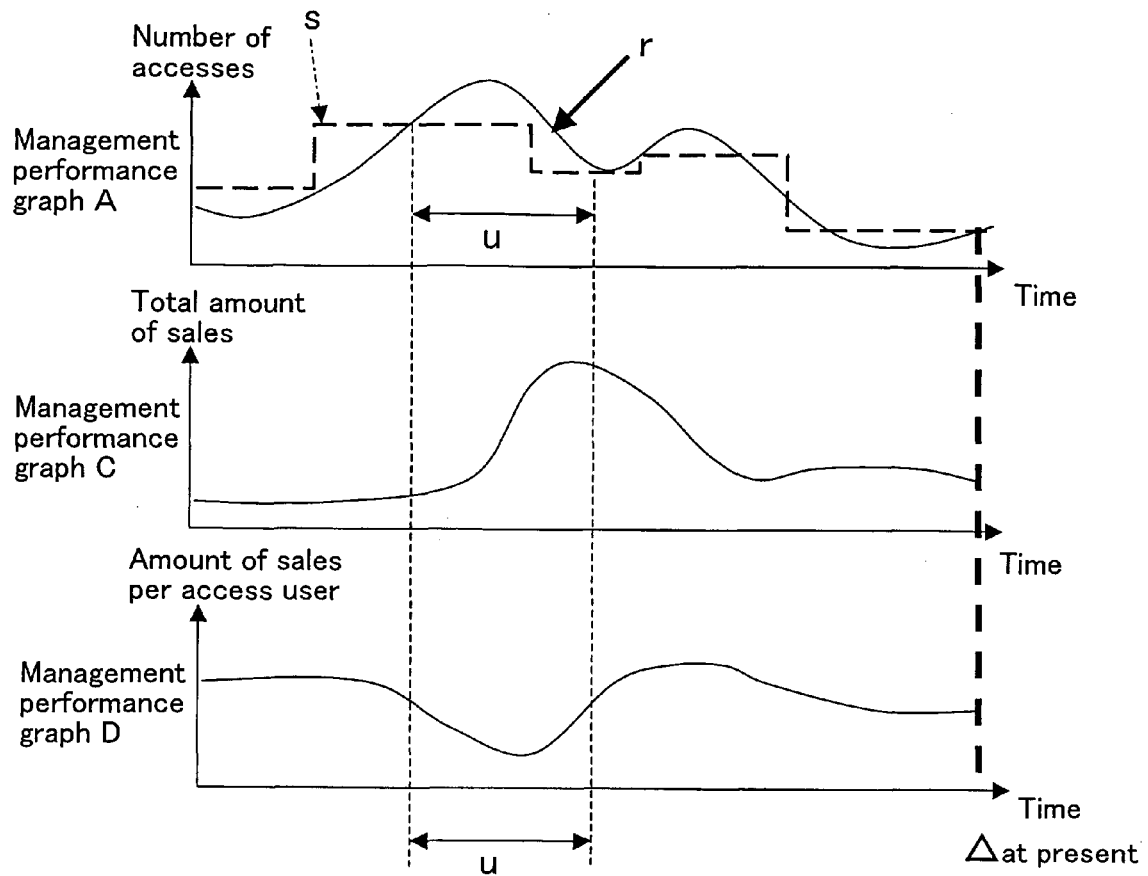
FIG. 12 is a graph showing examples of a management performance and sales performances in a predetermined period to date, which are represented as management data and business data, respectively.

FIG. 12 is a graph showing examples of the management performance and the sales performances in a predetermined period to date, which are represented as the management data and the business data, respectively. The top graph in FIG. 12 is a management performance graph A indicating the management performance represented as the management data. In the management performance graph A, a vertical axis represents the number of accesses, and a horizontal axis represents time. A curved line r represents a change in the number of users who have actually accessed the system. A broken line s represents a change in the number of visitors that can be handled by the IT resource 16a. In a section u, there is access from users exceeding the number of visitors that can be handled by assigned IT resource. Thus, the section u is extracted in Step S22.

The scale data generation part 13 obtains business data in the section in which there is access from users exceeding the number of visitors that can be handled by the assigned IT resource from, for example, a business system such as the mail-order system and the like (Step S23). The scale data generation part 13 calculates an amount of sales per user from the obtained business data.

The scale data generation part 13 calculates an average amount of sales per user in the section u extracted in Step S22, i.e., the section in which the IT resource is in short supply with respect to the demand. The scale data generation part 13 further calculates an average amount of sales in a section (in normal times) in which there is an adequate supply of the IT resource with respect to the demand. The scale data generation part 13 obtains a difference or a ratio between the average amounts of sales in the section of short supply and in the section of adequate supply. As a result, a decrease in average sales per user in the extracted section can be calculated (Step S24). For example, "a ratio (%) between an amount of sales per user in normal times and an amount of sales per user when access is concentrated" is obtained as a decrease in sales.

In FIG. 12, a sales performance graph C indicates a change in a total amount of sales, and a sales performance graph D indicates a change in the amount of sales per user. In each of the sales performance graphs C and D, a vertical axis represents an amount of sales, and a horizontal axis represents time. In the section u in the sales performance graph D, the amount of sales per user is reduced due to an overload caused by access concentration.

The scale data generation part 13 associates the shortage/surplus of the IT resource in the section extracted in Step S22 with the decrease in sales calculated in Step S24, and records the association in the recording part 5 as the value scale data 11 (Step S25).

For example, "a ratio (%) of the IT resource to be supplied with respect to an actual demand" as the shortage/surplus is associated with "a ratio (%) between an amount of sales per user in normal times and an amount of sales per user when access is concentrated" as the decrease in sales, and this association is registered with the value scale data 11. The data representing the shortage/surplus and the decrease in sales to be registered may be expressed as a difference, as well as a ratio. Alternatively, both of them may be registered.

The shortage/surplus and the decrease in sales are calculated by using the number of visitors. However, the present invention is not limited thereto, and other management information such as the number of users who log in to the system, an amount of transferred data, and the like may be used for the calculation. In the present embodiment, the data representing an amount of sales are calculated, for example. However, any data may be calculated as long as they serve as a scale necessary for a later comparative evaluation of the management policies and represent a management index. For example, a change in a stock turnover rate, an amount of sales of a specific product, a profit rate per site, or the like may be calculated.

As described above, the scale data generation part 13 associates the business data concerning disposal of business with the management data representing the management performance, so as to generating the value scale data 11. In this manner, the scale data generation part 13 generates the value scale data 11.

Further, the scale data generation part 13 can generate the value scale data 11 based on industry-specific value scale data 11b and size-specific value scale data 11c. Each of the industry-specific value scale data 11b and the size-specific value scale data 11c are a kind of standard value scale data in the entire IDC 24.

The plurality of managers in the IDC 24 have their own value scale data 11 suited for their business environments. The value scale data 11 of the plurality of managers are accumulated and recorded in the recording part 5, for example.

The scale data generation part 13 compiles the value scale data 11 of the plurality of managers by business field, and generates the industry-specific value scale data 11b. Examples of the business field include tour business, renting business, music distribution business, retail business, pay net contents, and the like.

Further, the scale data generation part 13 compiles the value scale data 11 of the plurality of managers by size, and generates the size-specific value scale data 11c. For example, the size of business can be divided in terms of the number of service users, or the like. For example, the size of business is divided into four classes: smaller than 1,000 service users, 1,000 to 10,000 service users, 10,000 to 100,000 service users, and 100,000 or more service users.

Figure 13:
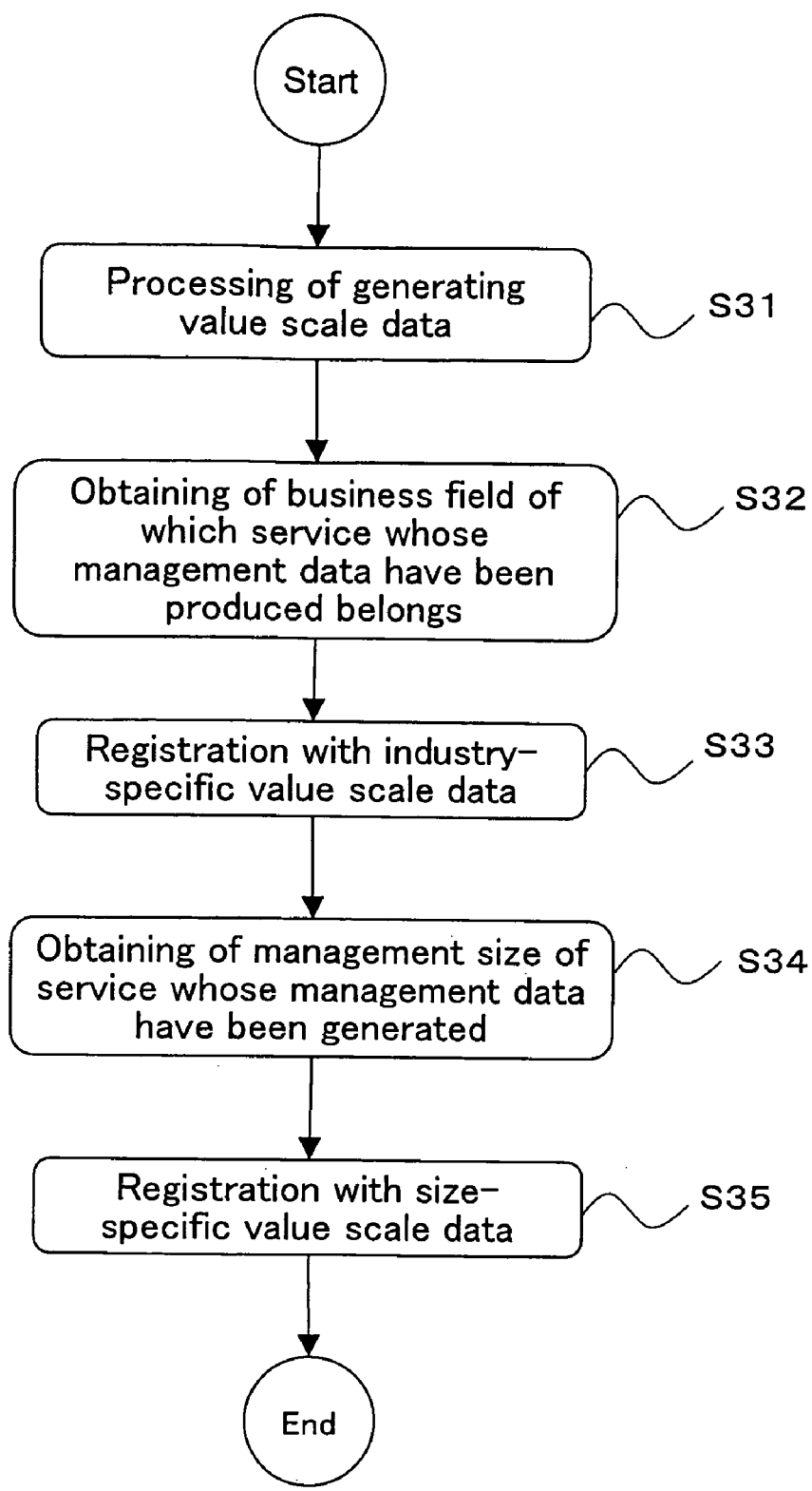
FIG. 13 is a flow chart showing an example of processing of the scale data generation part 13 for generating industry-specific value scale data 11b and size-specific value scale data 11c.
Figure 14:
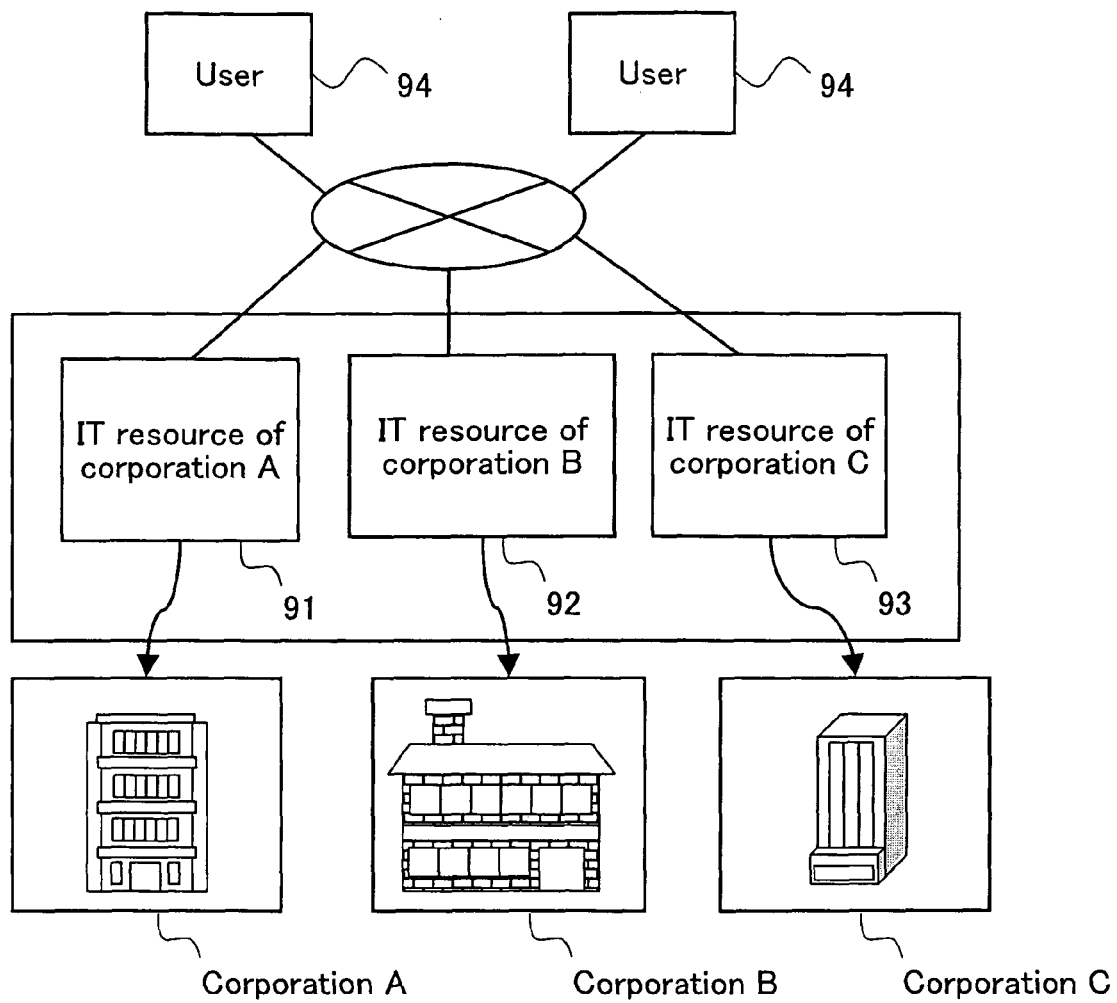
FIG. 14 is a schematic view showing a system configuration of a general IDC.

The following description is directed to processing of the scale data generation part 13 for generating the industry-specific value scale data 11b and the size-specific value scale data 11c. FIG. 13 is a flow chart showing an example of processing of the scale data generation part 13 for generating the industry-specific value scale data 11b and the size-specific value scale data 11c.

The scale data generation part 13 generates the value scale data 11 (Step S31). The detailed processing in Step S31 is the same as that in Steps S21 to S25 in FIG. 11, and thus the description thereof will be omitted.

The scale data generation part 13 obtains information on a business field of the value scale data 11 generated in Step S31, from the management log used to generate the value scale data 11, for example, (Step S32). For example, the scale data generation part 13 obtains information indicating a business field of service offered by the system that has generated the management data. The scale data generation part 13 registers the value scale data 11 generated in Step S31 with the industry-specific value scale data 11b as value scale data belonging to the business field indicated by the information obtained in Step S32 (Step S33).

In Step S34, the scale data generation part 13 obtains information on a management size of the system of the value scale data 11 generated in Step S31, from the management data used to generate the value scale data 11 as in Step S32, for example (Step S34). For example, the scale data generation part 13 obtains information indicating a management size of the system that has generated the management data. The scale data generation part 13 registers the value scale data 11 generated in Step S31 with the size-specific value scale data 11c as value scale data on the management size indicated by the information obtained in Step S34 (Step S35).

The scale data generation part 13 can generate the industry-specific value scale data 11b or the size-specific value scale data 11c as a complement to the value scale data 11.

For example, the scale data generation part 13 can obtain data from the industry-specific value scale data 11b by using as a search key a business world to which service to be offered in the future using the IT resource 16a belongs, and can record the obtained data as the value scale data 11 in an early stage. Alternatively, the scale data generation part 13 can obtain data from the size-specific value scale data 11c by using a management size as a search key, and can record the obtained data as the value scale data 11 in an early stage.

Thereafter, by using the management performance 14, the scale data generation part 13 can refine the value scale data 11 recorded in the above-mentioned manner. The scale data generation part 13 generates the value scale data 11 based on the management performance 14 as shown in FIG. 11, for example. Consequently, the scale data generation part 13 can generate the value scale data 11 appropriately even if it is difficult to set appropriate value scale data 11 because, for example, the IT resource 16a is in the early stages of management and few management performances have been achieved yet.

As described above, the management policy evaluation system according to each of Embodiments 1, 2, 3, and 4 performs simulation using the demand-forecasting model or analyzes the management log, so as to obtain shortage/surplus of the IT resource to be managed based on a determined management policy. A profit or a loss due to the shortage/surplus of the IT resource is quantified as a management index in terms of opportunity loss due to procurement shortage of the IT resource and over-investment based on surplus of the IT resource. The quantified management index is provided particularly to managers other than those in an IT department as information for judging the validity of a utility management policy. As a result, a manager in a management zone who makes a judgment on investment in an IT resource can obtain a clear criterion for judging a management policy.

The management policy evaluation system according to the present invention can quantify value to be created by investment based on a management policy for managing an IT system, and therefore the IT system can have increased adjustability with respect to a business environment.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A management policy evaluation system constituted by a computer including a processor and a memory, for evaluating a management policy that establishes a rule for assigning an IT resource to be provided in a system that offers service to a user, in accordance with a state of use by the user, the evaluation system comprising:
    a demand recording part implemented by the memory for recording demand data representing a change in a value of a demand for the service from the user in a predetermined period, the value of the demand being expressed as an operating amount of the IT resource;
    a supply recording part implemented by the memory for recording supply data representing a change in a value of a supply of the service to be provided by the IT resource to be assigned based on the management policy in the predetermined period, the value of the supply being expressed as the operating amount;
    a calculation part implemented by the processor for calculating shortage/surplus data representing a change in shortage/surplus of the IT resource with respect to the demand in the predetermined period by using the demand data recorded in the demand recording part and the supply data recorded in the supply recording part;
    an evaluation part implemented by the processor for converting the change in shortage/surplus of the IT resource represented by the shortage/surplus data calculated by the calculation part into evaluation data representing a quantified business judgment index value; and
    a value scale data recording part implemented by the memory for recording an association data that associates shortage/surplus of the IT resource with the quantified business judgment index value,
    wherein the evaluation part converts the shortage/surplus data into the evaluation data using the association data recorded in the value scale data recording part, and
    wherein the evaluation part generates data representing an amount of opportunity loss as the evaluation data based on, among the shortage/surplus data, data representing a shortage in the value of the supply with respect to the value of the demand, and generates data representing an amount of over-investment as the evaluation data based on, among the shortage/surplus data, data representing a surplus in the value of the supply with respect to the value of the demand.

2. The management policy evaluation system according to claim 1, wherein the demand data are obtained by simulation based on a demand-forecasting model that is data representing a pattern of the change in the demand for the service from the user.

3. The management policy evaluation system according to claim 1,
    wherein the demand data are generated based on log data representing the state of use of the service by the user or an operating state of the IT resource, and
    the supply data are generated based on the log data.

4. The management policy evaluation system according to claim 1,
    wherein the supply recording part records the supply data with respect to each of a plurality of different management policies,
    the calculation part calculates the shortage/surplus data with respect to each of the plurality of management policies, and the evaluation part generates the evaluation data with respect to each of the plurality of management policies, the evaluation system further comprising a display part for displaying the evaluation data with respect to each of the plurality of management policies so as to allow comparison between the evaluation data.

5. The management policy evaluation system according to claim 1, wherein the supply recording part records supply data representing a change in the value of the supply in the predetermined period when a plurality of different management policies are used in different periods, respectively, within the predetermined period for the assignment of the IT resource, and the evaluation part generates the evaluation data with respect to each of the plurality of management policies.

6. The management policy evaluation system according to claim 1, further comprising:

a performance recording part implemented by the memory for recording management performance data including log data representing a state of use of the service by the user or an operating state of the IT resource and profit/loss data representing an amount of a profit or a loss created in the past by the user using the service; and a scale information generation part implemented by the processor for generating the association data based on the management performance data.

7. The management policy evaluation system according to claim 1, wherein the value scale data recording part records a plurality of value scale data in a plurality of different systems, the scale information generation part generates standard value scale data based on the plurality of value scale data, and the evaluation part generates the evaluation data using the standard value scale data.

8. A non-transitory recording medium storing a management policy evaluation program for allowing a computer to execute processing of evaluating a management policy that establishes a rule for assigning an IT resource to be provided in a system that offers service to a user, in accordance with a state of use by the user, the management policy evaluation program allowing the computer to execute:

calculation processing of using demand data representing a change in a value of a demand for the service from the user in a predetermined period, the value of the demand being expressed as an operating amount of the IT resource, and supply data representing a change in a value of a supply of the service to be provided by the IT resource to be assigned based on the management policy in the predetermined period, the value of the supply being expressed as the operating amount, so as to calculate shortage/surplus data representing a change in shortage/surplus of the IT resource with respect to the demand in the predetermined period; and evaluation processing of converting the change in shortage/surplus of the IT resource represented by the shortage/surplus data calculated by the calculation processing into evaluation data representing a quantified business judgment index value, by using association data that associates shortage/surplus of the IT resource with the quantified business judgment index value, wherein the evaluation processing generates data representing an amount of opportunity loss as the evaluation data based on, among the shortage/surplus data, data representing a shortage in the value of the supply with respect to the value of the demand, and generates data representing an amount of over-investment as the evaluation based on, among the shortage/surplus data, data representing a surplus in the value of the supply with respect to the value of the demand.

9. A management policy evaluation system constituted by a computer including a processor and a memory, for evaluating a management policy that establishes a rule for assigning an IT resource to be provided in a system that offers service to a user, in accordance with a state of use by the user, the evaluation system comprising:

a demand recording part implemented by the memory for recording demand data representing a change in a value of a demand for the service from the user in a predetermined period, the value of the demand being expressed as an operating amount of the IT resource;

a supply recording part implemented by the memory for recording supply data representing a change in a value of a supply of the service to be provided by the IT resource to be assigned based on the management policy in the predetermined period, the value of the supply being expressed as the operating amount;

a calculation part implemented by the processor for calculating shortage/surplus data representing a change in shortage/surplus of the IT resource with respect to the demand in the predetermined period by using the demand data recorded in the demand recording part and the supply data recorded in the supply recording part;

an evaluation part implemented by the processor for converting the change in shortage/surplus of the IT resource represented by the shortage/surplus data calculated by the calculation part into evaluation data representing a quantified business judgment index value;

a value scale data recording part implemented by the memory for recording an association data that associates shortage/surplus of the IT resource with the quantified business judgment index value;

a performance recording part implemented by the memory for recording management performance data including log data representing a state of use of the service by the user or an operating state of the IT resource and profit/loss data representing an amount of profit and loss created in the past by the user using the service; and a scale information generation part implemented by the processor for generating the association data based on the management performance data, wherein the evaluation part converts the shortage/surplus data into the evaluation data using the association data recorded in the value scale data recording part, and wherein the evaluation part generates data representing an amount of opportunity loss as the evaluation data based on, among the shortage/surplus data, data representing a shortage in the value of the supply with respect to the value of the demand, and generates data representing an amount of over-investment as the evaluation based on, among the shortage/surplus data, data representing a surplus in the value of the supply with respect to the value of the demand.

10. The management policy evaluation system according to claim 9, wherein the demand data are obtained by simulation based on a demand-forecasting model that is data representing a pattern of the change in the demand for the service from the user.

11. The management policy evaluation system according to claim 9, wherein the demand data are generated based on log data representing the state of use of the service by the user or an operating state of the IT resource, and the supply data are generated based on the log data.

12. The management policy evaluation system according to claim 9, wherein the supply recording part records the supply data with respect to each of a plurality of different management policies, the calculation part calculates the shortage/surplus data with respect to each of the plurality of management policies, and the evaluation part generates the evaluation data with respect to each of the plurality of management policies, the evaluation system further comprising a display part for displaying the evaluation data with respect to each of the plurality of management policies so as to allow comparison between the evaluation data.

13. The management policy evaluation system according to claim 9, wherein the supply recording part records supply data representing a change in the value of the supply in the predetermined period when a plurality of different management policies are used in different periods, respectively, within the predetermined period for the assignment of the IT resource, and the evaluation part generates the evaluation data with respect to each of the plurality of management policies.

14. The management policy evaluation system according to claim 9, wherein the value scale data recording part records a plurality of value scale data in a plurality of different systems, the scale information generation part generates standard value scale data based on the plurality of value scale data, and the evaluation part generates the evaluation data using the standard value scale data.

15. A non-transitory recording medium storing a management policy evaluation program for allowing a computer to execute processing of evaluating a management policy that establishes a rule for assigning an IT resource to be provided in a system that offers service to a user, in accordance with a state of use by the user, the management policy evaluation program allowing the computer to execute:

calculation processing of using demand data representing a change in a value of a demand for the service from the user in a predetermined period, the value of the demand being expressed as an operating amount of the IT resource, and supply data representing a change in a value of a supply of the service to be provided by the IT resource to be assigned based on the management policy in the predetermined period, the value of the supply being expressed as the operating amount, so as to calculate shortage/surplus data representing a change in shortage/surplus of the IT resource with respect to the demand in the predetermined period;

evaluation processing of converting the change in shortage/surplus of the IT resource represented by the shortage/surplus data calculated by the calculation processing into evaluation data representing a quantified business judgment index value, by using association data that associates shortage/surplus of the IT resource with the quantified business judgment index value;

recording management performance data including log data representing a state of use of the service by the user or an operating state of the IT resource and profit/loss data representing an amount of a profit or a loss created in the past by the user using the service; and generating the association data based on the management performance data, wherein the evaluation processing converts the shortage/surplus data into the evaluation data using the association data, and wherein the evaluation processing generates data representing an amount of opportunity loss as the evaluation data based on, among the shortage/surplus data, data representing a shortage in the value of the supply with respect to the value of the demand, and generates data representing an amount of over-investment as the evaluation based on, among the shortage/surplus data, data representing a surplus in the value of the supply with respect to the value of the demand.

* * * * *